United States Patent
Morikawa et al.

[11] Patent Number: 6,061,354
[45] Date of Patent: *May 9, 2000

[54] MICRO-FRAME MULTIPLEX TRANSMITTER

[75] Inventors: Hiroki Morikawa, Koganei; Yukichi Saito, Higashiyamato; Hiroshi Kawakami; Fumiaki Ishino, both of Tokyo; Akihisa Nakajima, Higashimurayama, all of Japan

[73] Assignee: NTT Mobile Communications Network, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/894,585
[22] PCT Filed: Dec. 24, 1996
[86] PCT No.: PCT/JP96/03764

§ 371 Date: Aug. 22, 1997

§ 102(e) Date: Aug. 22, 1997

[87] PCT Pub. No.: WO97/23975

PCT Pub. Date: Jul. 3, 1997

[30] Foreign Application Priority Data

Dec. 25, 1995 [JP] Japan .................................. 7-337547

[51] Int. Cl.[7] .................................................. H04L 12/28
[52] U.S. Cl. ........................................... 370/395; 370/389
[58] Field of Search .................................... 370/389, 395, 370/470, 471, 535, 916, 472, 412, 413

[56] References Cited

U.S. PATENT DOCUMENTS

| | | | |
|---|---|---|---|
| 4,589,108 | 5/1986 | Billy | 370/535 |
| 5,425,031 | 6/1995 | Otsuka | 370/360 |
| 5,509,007 | 4/1996 | Takashima | 370/391 |
| 5,561,466 | 10/1996 | Kiriyama | 370/395 |
| 5,615,210 | 3/1997 | Kaiyama | 370/389 |
| 5,617,415 | 4/1997 | Kowalk | 370/395 |
| 5,657,316 | 8/1997 | Nakagaki | 370/394 |

FOREIGN PATENT DOCUMENTS

| | | | |
|---|---|---|---|
| 0662778 | 7/1995 | European Pat. Off. . | |
| 2-225261 | 9/1990 | Japan . | |
| 07087124 | 3/1995 | Japan . | |
| 07087126 | 3/1995 | Japan . | |
| 07095215 | 4/1995 | Japan . | |
| 07202895A | 4/1995 | Japan | H04L 12/28 |
| 07202895 | 8/1995 | Japan . | |
| 07245628 | 9/1995 | Japan . | |
| 07336354 | 12/1995 | Japan . | |

OTHER PUBLICATIONS

Masatomo Nakano, et al., "Study of Low–rate Voice ATM Transmission Method in Mobile Multi–media", IEICE, Sep. 5, 1994.

Hiroki Morikawa, et al. "Voice Communication System in Mobile ATM Communication Network", IEICE, Mar. 10, 1995.

*Primary Examiner*—Ajit Patel
*Assistant Examiner*—Ricardo M. Pizarro
*Attorney, Agent, or Firm*—Brown Raysman Millstein Felder & Steiner LLP

[57] ABSTRACT

A concrete circuit configuration is proposed of a multiplex transmitter for loading a standard ATM cell with multiplexed micro-frames which are each shorter than the standard ATM cell. The input micro-frames are delivered to a distributor 504 in the input order through an interface 503. The distributor 504 distributes the input micro-frames using distributing information input. The distributing information accords with the service condition of each connection or micro-frame. An extracting circuit 506 selects buffers in accordance with predetermined buffer selection logic. A cell cancellation monitor circuit 508 relinquishes micro-frames exceeding cell tolerable time periods T2-1–T2-m. A multiplexing processor 507 transfers the cell or a idle cell to a sender 511 in accordance with the cell transfer timing of the sender 511.

10 Claims, 23 Drawing Sheets

FIG.1A STANDARD ATM CELL

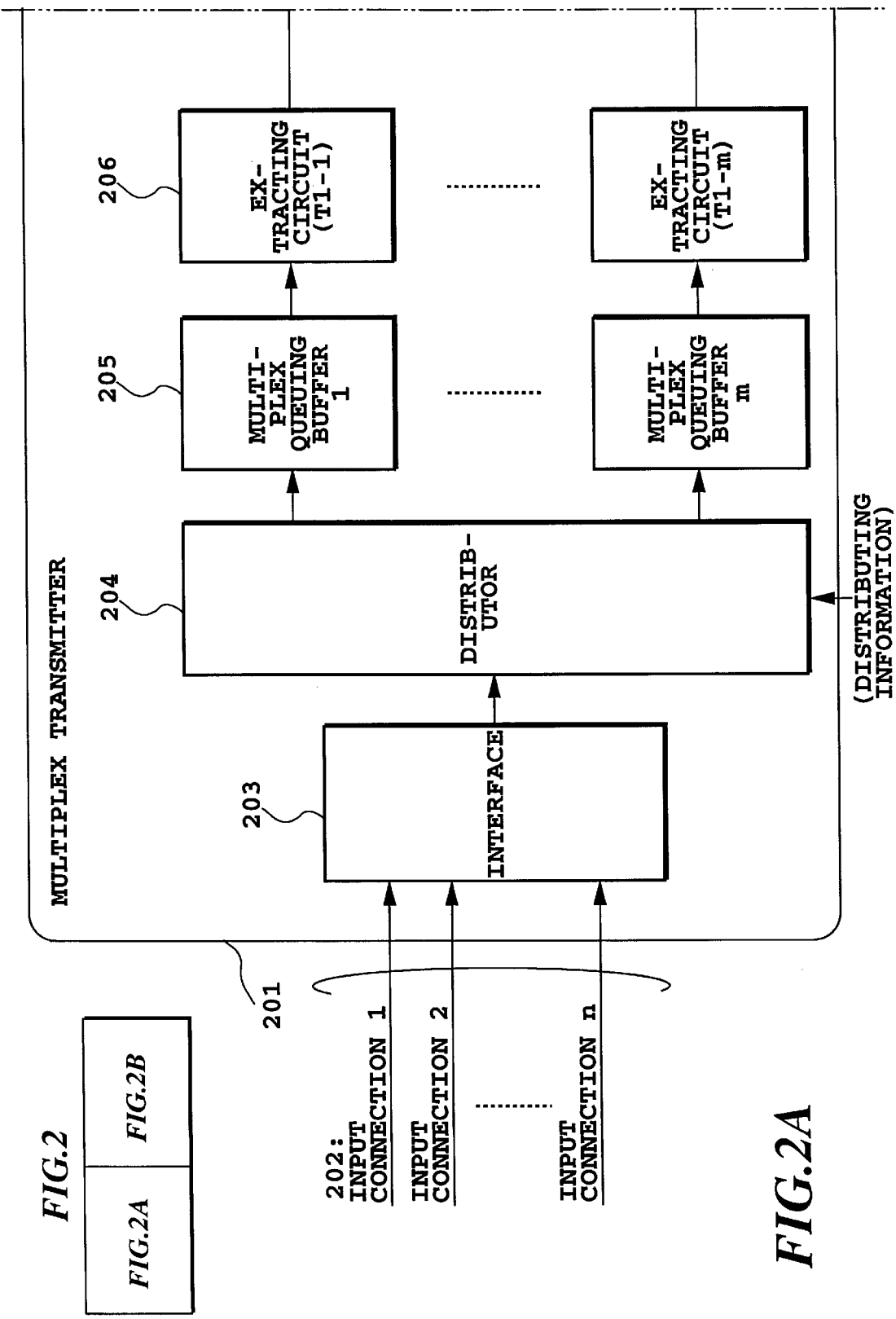

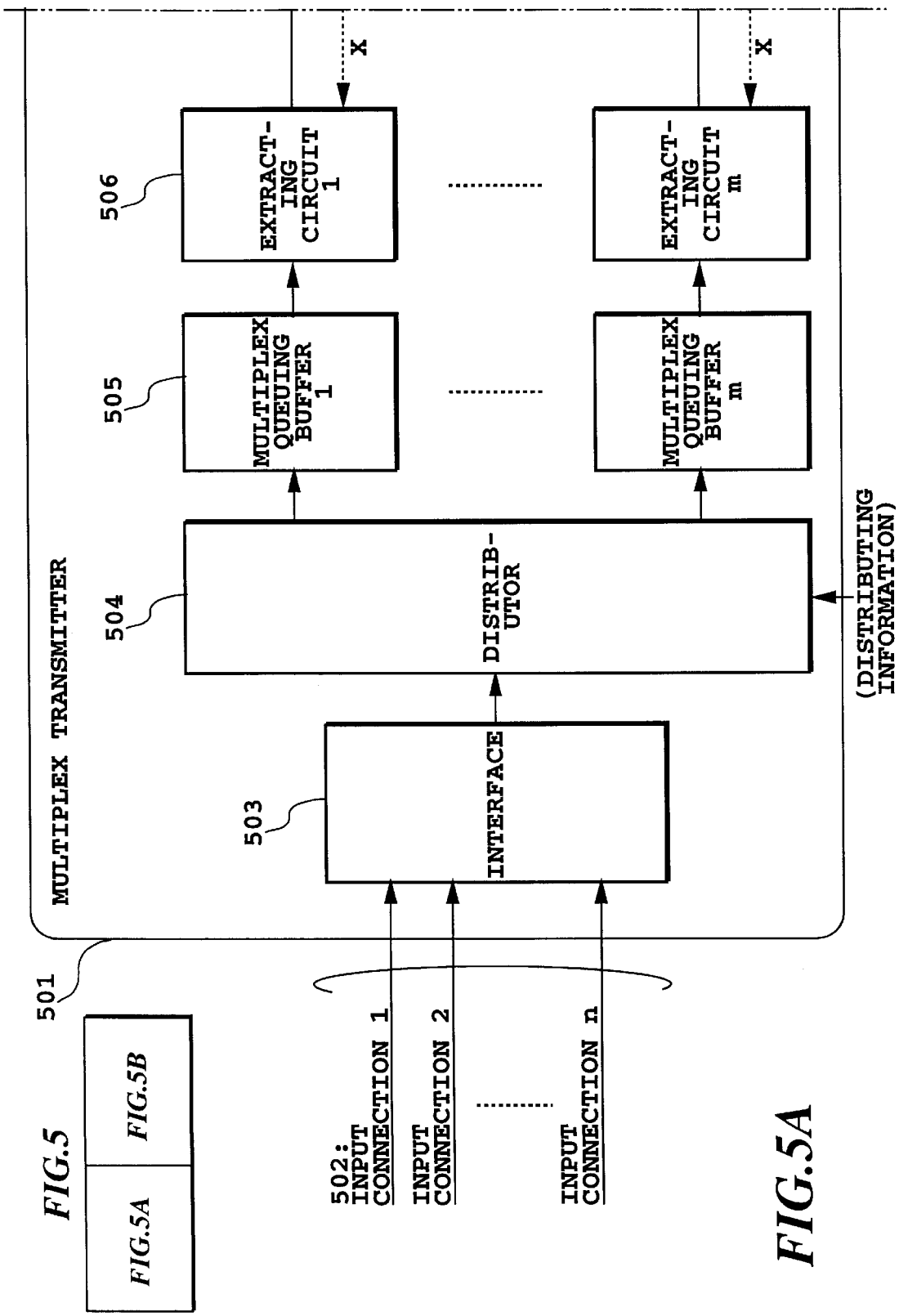

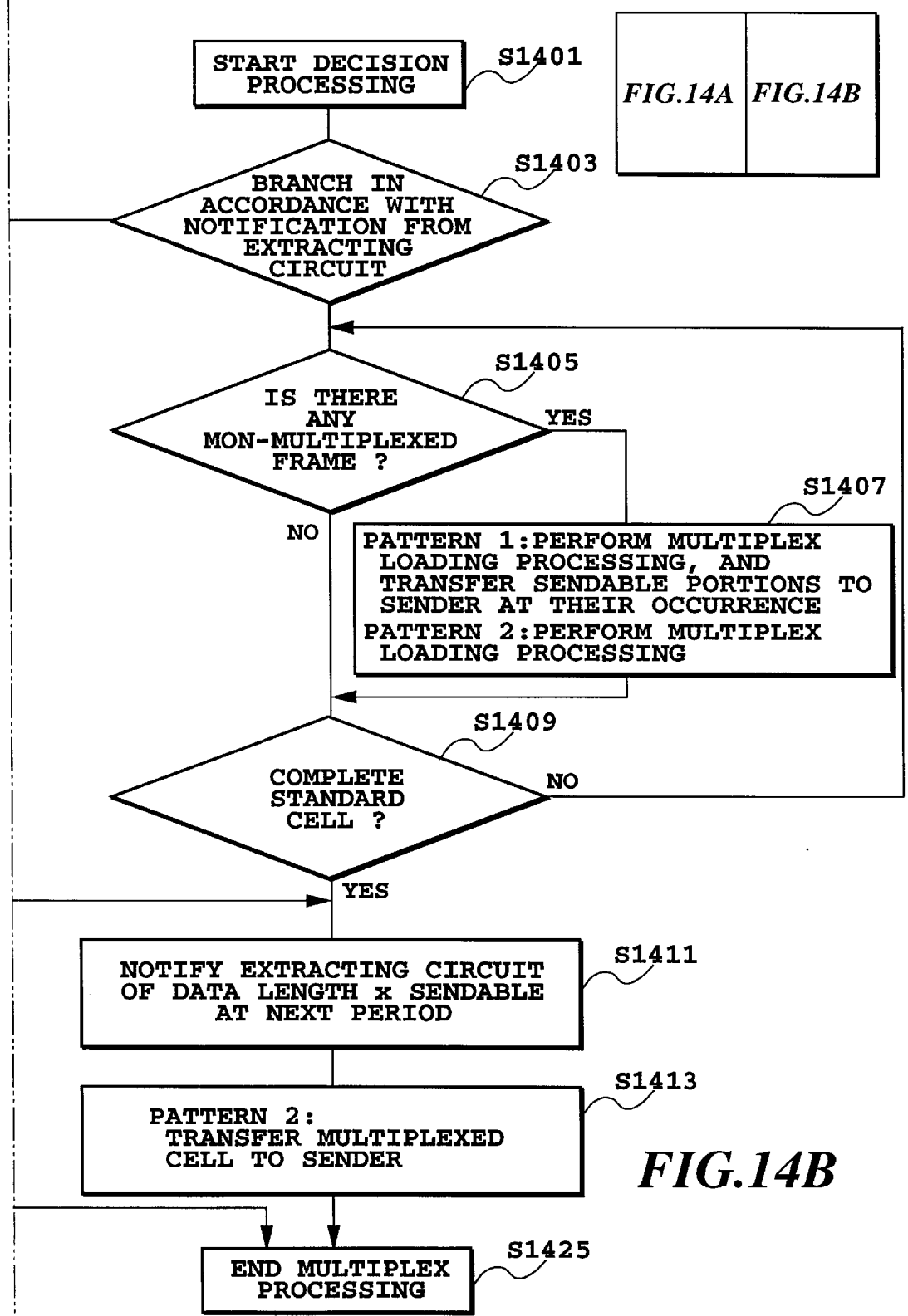

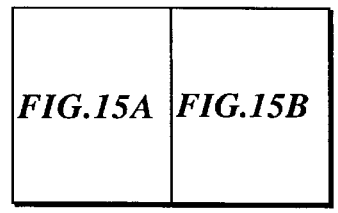
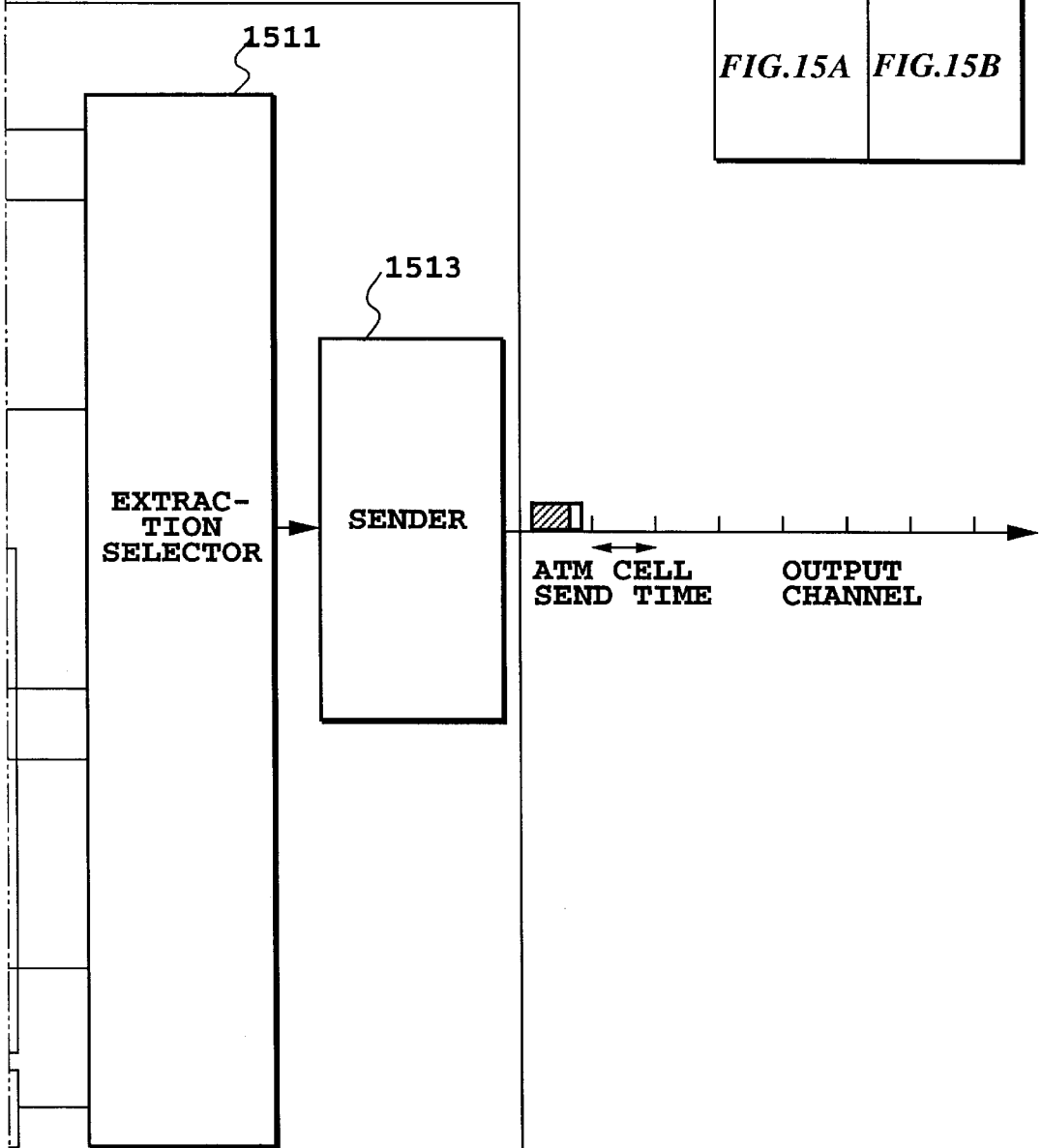
FIG.15B

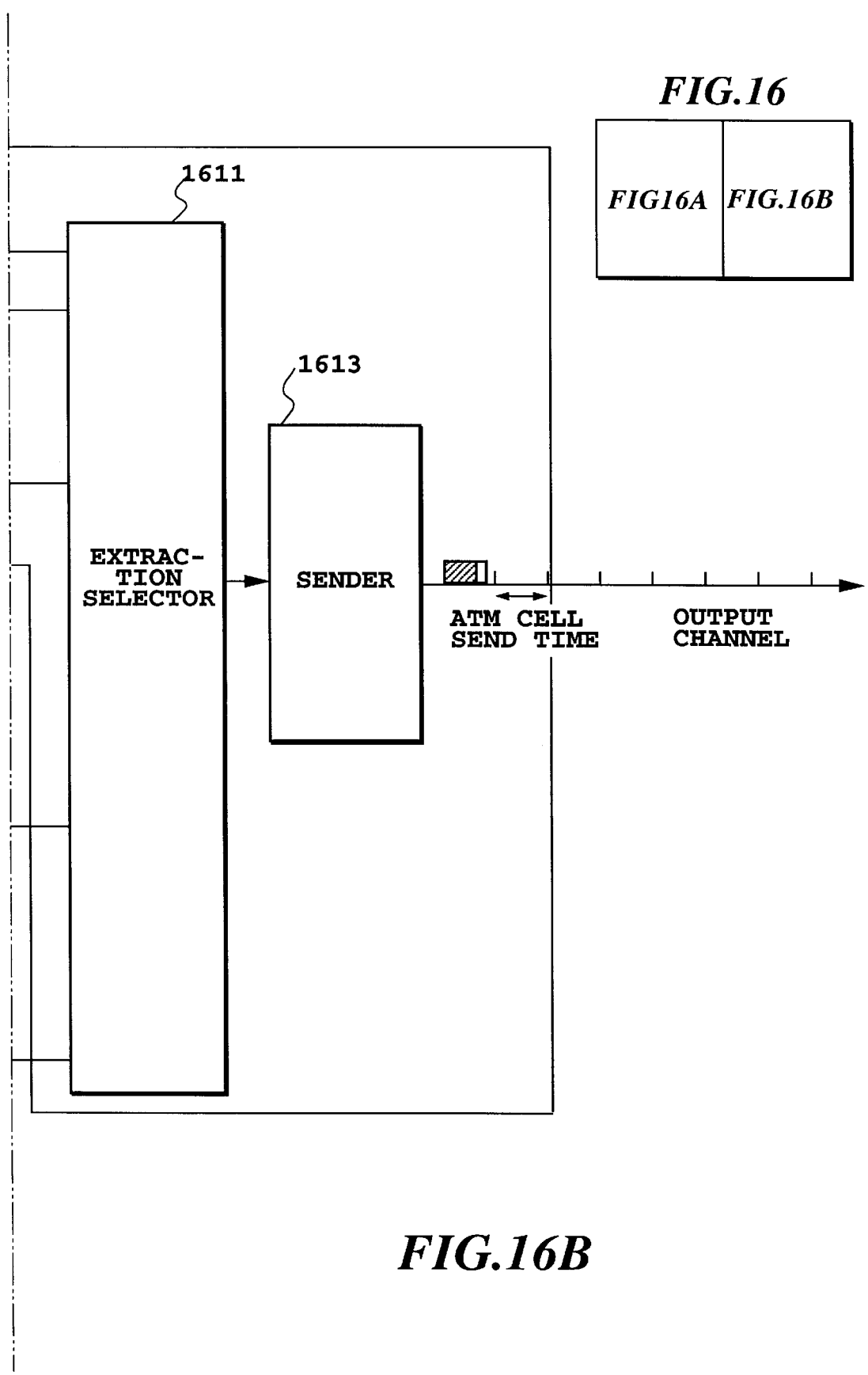

MICRO-FRAME MULTIPLEX TRANSMITTER

TECHNICAL FIELD

The present invention relates to a system configuration for loading a standard ATM cell with connections in the form of multiple low rate micro-frames in accordance with predetermined format in ATM (asynchronous transfer mode) transmission.

The description of the present specification is based on that of the specification of Japanese patent application No. 7-337547 filed on Dec. 25, 1995, on which the present application claims convention priority, and the contents of the Japanese patent application are incorporated here by reference.

BACKGROUND ART

Methods for loading a standard ATM cell with multiplexed connections in the form of micro-frames including data shorter than the standard ATM cell are variously proposed, and one of them is disclosed, for example, in Japanese patent application No. 7-266039, "Short cell multiplexed ATM transmission system and transmission method", which was filed by the assignee of the present invention and now abandoned without publication by refiling as Japanese Patent Application No. 8-52169 on Mar. 8, 1996. The assignee of the. present application filed U.S. National Phase Application 08/966,862 of PCT Application PCT/JP96/02954, coaiming convention priority of the Japanese Patnet Application No. 8-52169. However, the inventors of the present invention do not know any concrete configuration designed for multiplexing the micro-frames, and for carrying out its control and fast processing thereof in a multiplex transmitter that performs multiplexing of the micro-frames.

The object of the present invention is to provide a concrete configuration of a high speed multiplexed transmitter for loading standard ATM cells with a plurality of connections in the form of micro-frames including data shorter than the standard ATM cell.

Another object of the present invention is to achieve effective multiplex transmission processing by incorporating two buffers, a buffer for deciding micro-frames to be multiplexed and a transmission queuing buffer, into a single queuing buffer.

Still another object of the present invention is to achieve quality management of micro-frame connections having multiple qualities concerning a tolerable multiplexing wait time or a micro-frame cancellation ratio, and to implement multiplex transmission processing at high efficiency.

DISCLOSURE OF THE INVENTION

In a first aspect of the present invention, there is provided a multiplex transmitter for performing multiplex transmission by loading a standard ATM cell with multiplexed connections composed of micro-frames each including data shorter than the standard ATM cell, the multiplex transmitter comprising:

a distributor for distributing input micro-frames;

multiplex queuing buffers for storing the input microframes which have been distributed;

an extracting portion for extracting entire micro-frames in the multiplex queuing buffers when a predetermined extracting time comes, or when a number of the microframes in each of the multiplex queuing buffers reaches a predetermined number;

a multiplexing processor for carrying out multiplex processing onto the standard ATM cell in accordance with a predetermined multiplexing scheme;

a transmission queuing buffer for storing the ATM cell;

a cell cancellation monitor portion for canceling a cell whose dwell time in the transmission queuing buffer reaches a predetermined canceling time;

an extracting portion for extracting the ATM cell from the transmission queuing buffer; and a sender for transferring the extracted ATM cell to an output channel.

In a second aspect of the present invention, there is provided a multiplex transmitter for performing multiplex transmission by loading a standard ATM cell with multiplexed connections composed of micro-frames each including data shorter than the standard ATM cell, the multiplex transmitter comprising:

a distributor for distributing input micro-frames;

multiplex queuing buffers for storing the input microframes which have been distributed;

an extracting portion for extracting entire micro-frames in each of the multiplex queuing buffers when a predetermined extracting time comes, or when a total length of the micro-frames in each of the multiplex queuing buffers reaches a data length;

a multiplexing processor for carrying out multiplex processing onto the standard ATM cell in accordance with a predetermined multiplexing scheme, and notifies the extracting portion of the data length loadable onto a next ATM cell;

a transmission queuing buffer for storing the ATM cell;

a cell cancellation monitor portion for canceling a cell whose dwell time in the transmission queuing buffer reaches a predetermined canceling time;

an extracting portion for extracting the ATM cell from the transmission queuing buffer; and a sender for transferring the extracted ATM cell to an output channel.

Here, the distributor may distribute the input microframes to the buffers having different multiplexing schemes in accordance with predetermined service conditions.

The multiplexing processor may determine extracting order from the buffers in accordance with the service conditions, may extract the micro-frames, and may select the multiplexing scheme in accordance with the service conditions.

In a third aspect of the present invention, there is provided a multiplex transmitter for performing multiplex transmission by loading a standard ATM cell with multiplexed connections composed of micro-frames each including data shorter than the standard ATM cell, the multiplex transmitter comprising:

a distributor for distributing input micro-frames;

multiplex queuing buffers for storing the input microframes which have been distributed;

a cell cancellation monitor portion for storing each input micro-frame into one of the buffers, for monitoring a dwell time of the micro-frame in the transmitter, and for canceling a micro-frame which dwells in the buffer for more than a predetermined canceling time;

an extracting portion for successively extracting from the buffers the micro-frames in accordance with their input order, a number of extracted micro-frames being limited within a predetermined multiplexing number;

a multiplexing processor for carrying out multiplex processing onto the standard ATM cell in accordance with a predetermined multiplexing scheme; and a sender for transferring the extracted ATM cell to an output channel.

In a fourth aspect of the present invention, there is provided a multiplex transmitter for performing multiplex transmission by loading a standard ATM cell with multiplexed connections composed of micro-frames each including data shorter than the standard ATM cell, the multiplex transmitter comprising:

a distributor for distributing input micro-frames;

multiplex queuing buffers for storing the input micro-frames which have been distributed;

a cell cancellation monitor portion for storing each input micro-frame into one of the buffers, for monitoring a dwell time of the micro-frame in the transmitter, and for canceling a micro-frame which dwells in the buffer for more than a predetermined canceling time;

an extracting portion for successively extracting from the buffers the micro-frames in accordance with their input order until an accumulated data length of the micro-frames and additional data exceeds a data length loadable onto a cell to be sent in a next term, or until a predetermined extracting time period has elapsed, a multiplexing processor for carrying out multiplex processing onto the standard ATM cell in accordance with a predetermined multiplexing scheme, and for notifying the extracting portion of the data length loadable onto the cell to be sent in the next term; and a sender for transferring the extracted ATM cell to an output channel.

Here, the multiplex transmitter may distribute the input micro-frames to the buffers having different multiplexing schemes or canceling times of the micro-frames in accordance with predetermined service conditions.

The multiplexing processor may determine extracting order from the buffers in accordance with the service conditions, may extract the micro-frames, and may select the multiplexing scheme in accordance with the service conditions.

The extracting portion may perform extracting control not only of the transmission queuing buffer which stores the ATM cell onto which the multiplexing has been carried out, but also of the transmission queuing buffer which stores the ATM cell onto which no multiplexing has been carried out.

The extracting portion may perform extracting control not only of the buffers which store multiplexed micro-frames, but also of a transmission queuing buffer which stores ATM cell onto which no multiplexing has been carried out.

BRIEF DESCRIPTION OF THE DRAWINGS

FIGS. 1A and 1B are diagrams illustrating multiplexing of micro-frames into a standard ATM cell;

FIGS. 2A and 2B are block diagrams showing an embodiment 1 of a multiplex transmitter for transmitting multiplexed cells in accordance with the present invention;

FIGS. 5A and 5B are block diagrams showing an embodiment 2 of the multiplex transmitter;

FIGS. 14A and 14B are flowcharts showing the processing logic of the multiplexing processor of the embodiment 4;

FIGS. 15A and 15B are block diagrams showing a first ATM cell transmitter of an embodiment 5;

FIGS. 16A and 16B are block diagrams showing a second ATM cell transmitter of the embodiment 5.

BEST MODE FOR CARRYING OUT THE INVENTION

The invention will now be described with reference to the accompanying drawings.

Figure 1B:
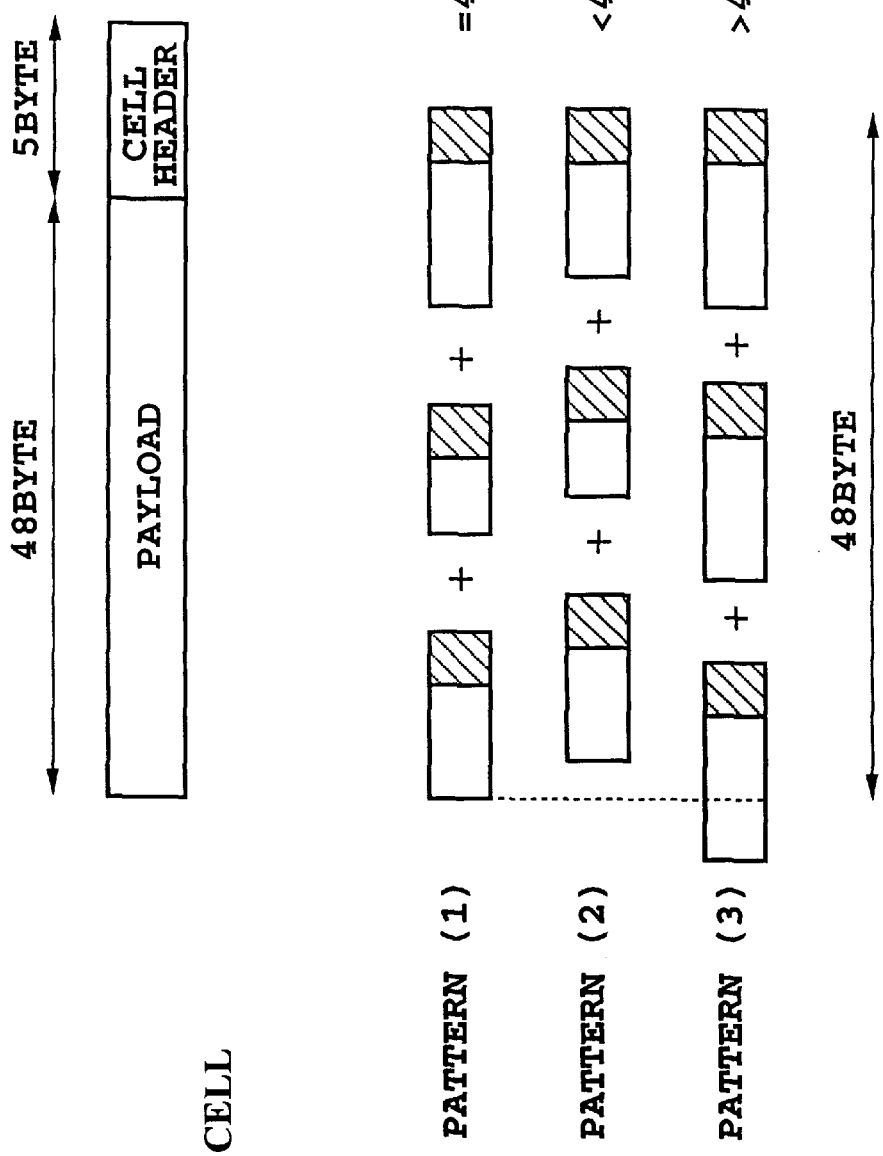

Referring to FIGS. 1A and 1B, a multiplexing scheme of the micro-frames into a standard ATM cell will now be described. FIG. 1A illustrates a standard ATM cell. The standard ATM cell has a fixed length of 53 bytes including a 5-byte header and a 48-byte payload (information field). As shown in FIG. 1B, the present invention multiplexes micro-frames including data shorter than the standard ATM cell. The micro-frame can be variable or fixed in its length. Furthermore, it can overlap two standard ATM cells as in pattern (3), or it cannot fill out the standard ATM cell as in pattern (2). In this case, dummy bits are filled to be transmitted. Although not shown in FIG. 1B, the micro-frame may be longer than the standard ATM cell.

EMBODIMENT 1

Figure 2B:
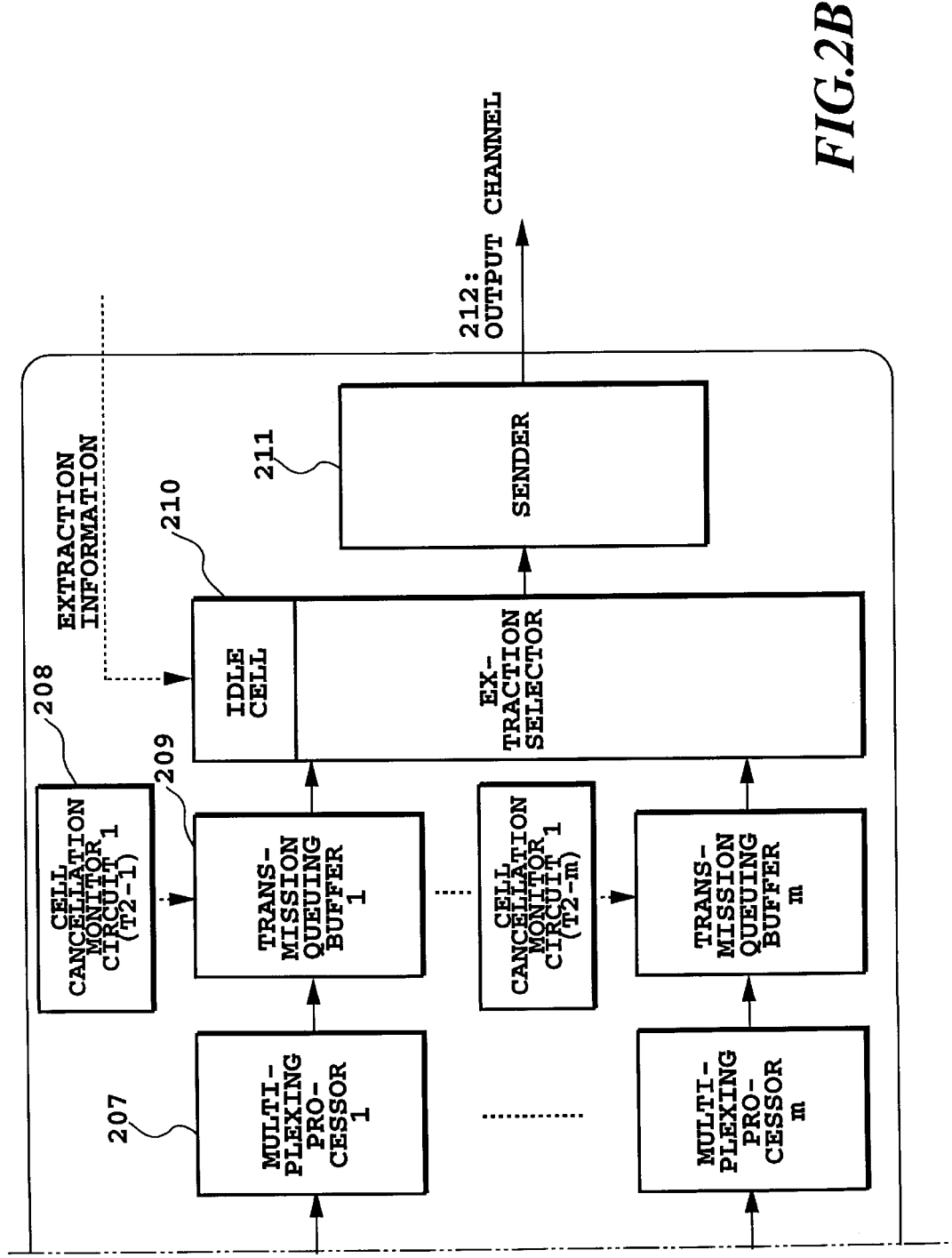
Figure 3:
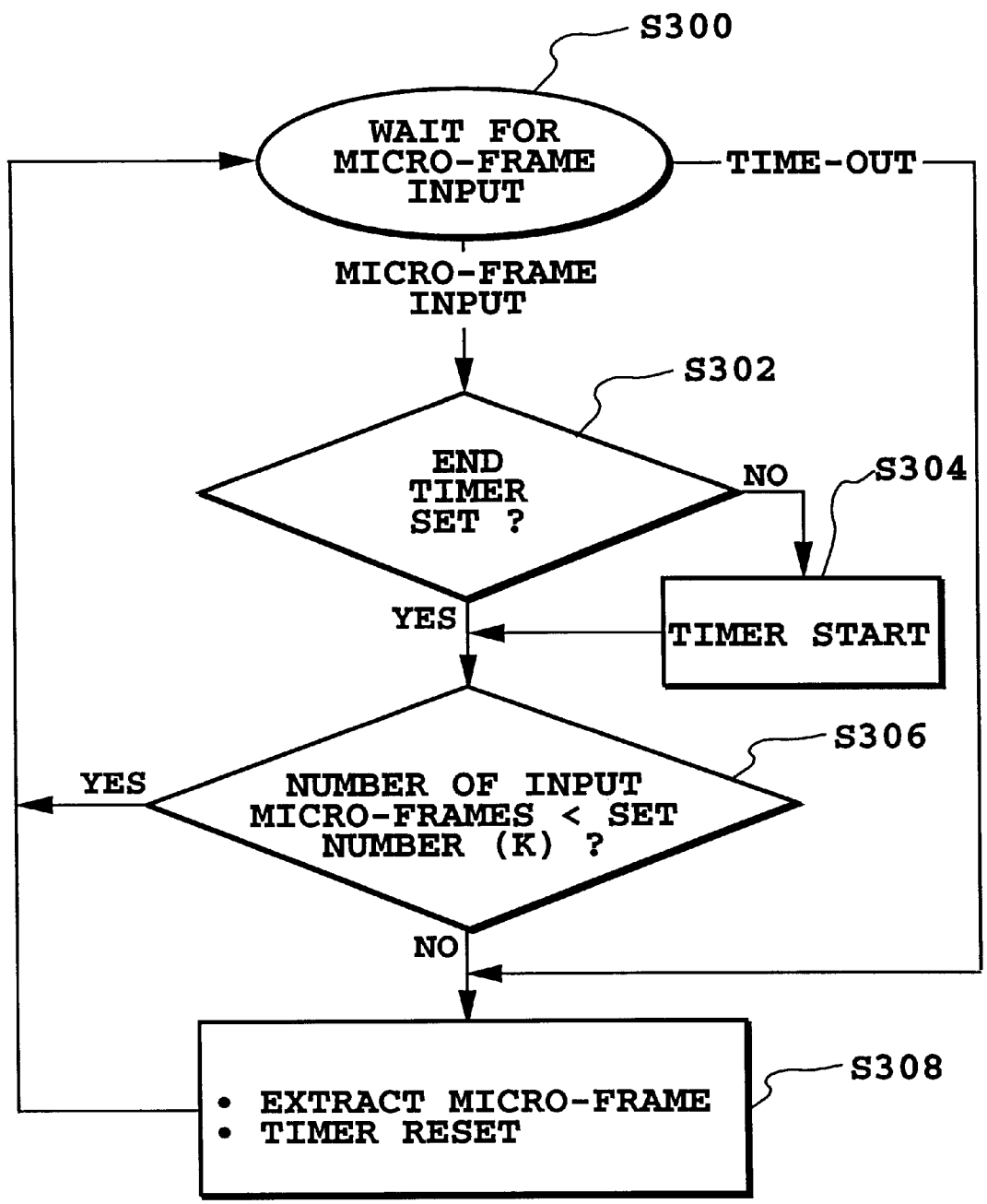
FIG. 3 is a flowchart showing the processing logic of an extracting circuit in the multiplex transmitter.
Figure 4:
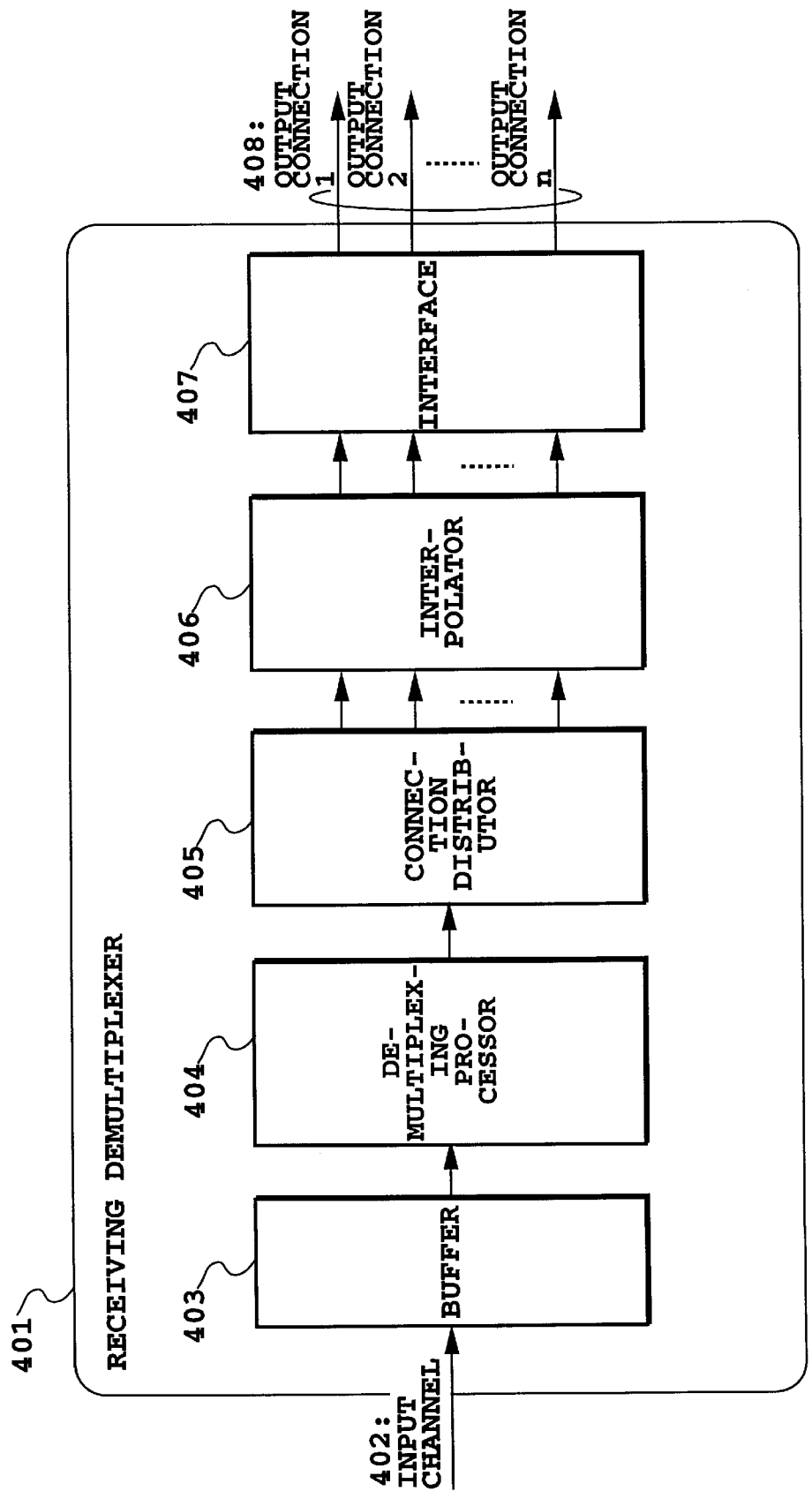
FIG. 4 is a diagram showing a receiving demultiplexer of received multiplexed cells.

FIGS. 2A and 2B are block diagrams showing an embodiment 1 of a multiplex transmitter 201 for transmitting multiplexed cell in accordance with the present invention. FIG. 3 illustrate the logic of extracting circuits 206 used in the multiplex transmitter 201, and FIG. 4 shows a configuration of a receiving demultiplexer 401.

The embodiment 1 in accordance with the present invention will now be described with reference to FIGS. 2A, 2B, 3 and 4.

In FIGS. 2A and 2B, micro-frames, that is, data connections 1-n, which are input to the multiplex transmitter 201 can be fixed or variable in length, or the same connection may be a link of fixed and variable lengths. In the embodiment 1, a case will be described in which the maximum number k of the micro-frames multiplexed into a single standard ATM cell is fixed. The maximum multiplexed number k is determined depending on a system environment and service conditions.

The transmission rate of the multiplex transmitter 201 is much higher than that of the input connections, and an interface 203 has a conflict control function between the input connections. Thus, all the input micro-frames can be processed in accordance with the input sequence attached thereto between the interface 203 and distributor 204, or between the interface 203 and multiplex queuing buffer 205.

The input micro-frames are fed to the distributor 204 through the interface 203 according to the input order. The distributor 204 distributes the input micro-frames using input distributing information. The present transmitter presumes to be basically used with a switching system (not shown) or the like which can identify the service types of the connections. Accordingly, the distributing information is generally sent from the switching system or the like.

The distributing information accords with the service condition of each connection or micro-frame. In the configuration of the embodiment 1, the service condition such as a cancellation tolerable time, a micro-frame cancellation ratio, or a multiplexing scheme like a maximum number k of multiplexed micro-frames can be separately assigned to a multiplexing processor 207 and cell cancellation monitor circuit 208 to distribute each micro-frame or connection. Alternatively, it is conceivable to input to the transmitter after distributing the input physically by the switching system or the like.

Generally, the service condition is determined for each connection. Hence, the distributing information should be identified for each connection. Alternatively, the microframe itself can have service information serving as the distributing information with predetermined format so that the distributor 204 can distribute in accordance with that information. Thus, the distributor 204 selects one of multiplex queuing buffers 205 for each micro-frame to be stored, in accordance with the distributing information.

Next, extracting circuits 206 have multiplexing wait times T1-1–T1-m, and cell cancellation monitor circuits 208 have cell cancellation tolerable times T2-1–T2-m, which are set in advance as fixed parameters of the system, where T1 and T2 are values determined in accordance with the system environment and service conditions.

The flowchart shown in FIG. 3 illustrates the extraction processing in the extracting circuits 206. In FIG. 3, each extracting circuit 206 keeps a constant monitoring over the corresponding multiplex queuing buffer 205 (S300). When the micro-frame is input to the multiplex queuing buffer 205, it starts processing: it checks whether a timer has been set (S302), and starts the timer if it has not yet been set (S304). If the timer has been set, it checks whether the number of micro-frames stored in the multiplex queuing buffer 205 equals the predetermined number k (S306). If the number is less than k, the extracting circuit 206 returns to the monitoring state (S300).

In this way, each extracting circuit 206 extracts the input micro-frames if their number reaches the preset number before the dwell time of the first input micro-frame counted from the end of the vacant state of the buffer exceeds time T1, and transfer the micro-frames to the corresponding multiplexing processor 207. In addition, unless the number of input micro-frames exceeds the preset number when the dwell time passes T1, the extracting circuit 206 transfers the entire input micro-frames to the multiplexing processor 207.

The multiplexing processor 207 carries out multiplex processing of the received micro-frames in accordance with the predetermined format to transform them into the standard ATM form, and stores it in each transmission queuing buffer 209.

An extraction selector 210 extracts from the transmission queuing buffers 209 the ATM cells, which have undergone the multiplex processing, in accordance with the logic of the extraction information input thereto, and transfers them to a sender 211. Each cell cancellation monitor circuit 208 monitors the corresponding transmission queuing buffer 209 ceaselessly, and relinquishes the cells that dwell there over time T2.

Several selecting methods are conceivable that can be designated by the extraction information. For example, the following methods can be considered.

1. A method that selects each one cell from the first to m-th transmission queuing buffers 209 cyclically.

2. A method that extracts from each buffer until the buffer becomes vacant in accordance with the predetermined sequence of the transmission queuing buffers 209, and then transfers to the next buffer.

3. A method that selects each one of the transmission queuing buffers 209 randomly.

4. A method that counts the number of the cells extracted from each transmission queuing buffer 209 so that the cells are extracted evenly.

5. A method that attaches weight to the ratios of the extracted numbers in the foregoing methods.

6. A method that combines the foregoing methods.

If there is no cell, a idle cell is selected to adjust transmission rate. The extraction selector 210 transfers the cells to the sender 211 according to the cell transmission timing of the sender 211.

The sender 211 outputs the cells extracted from the second buffers 209 at timings in accordance with output schemes.

The data thus multiplexed into standard ATM cells and transferred are demultiplexed to the original micro-frames at the receiving side. The configuration of a receiving demultiplexer 401 is shown in FIG. 4.

In FIG. 4, the receiving demultiplexer 401 is a unit for extracting micro-frames from the received cells. The received input cells are temporarily stored in a buffer 403, and a demultiplexing processor 404 carries out the demultiplex processing of the micro-frames in a manner corresponding to the multiplex processing in the transmitting side. The connection identification information of the microframes are present in each frame. It is necessary for this unit to possess the distributing information to perform the connection demultiplexing physically in this unit. In this case, the distributing information must be sent from the switching system as in the transmitting side, or added to the standard ATM cell in a predetermined format as identification information of the service conditions. In the former case, between the transmitting and receiving switching systems, a function for identifying negotiation processing of the service conditions of the multiplexed cells must be added to each connection of the micro-frames for distributing them.

Since the transmitting side carries out the cell cancellation to maintain the efficiency and quality of channels, the receiving end must perform the interpolation of the omitted cells, which is implemented by an interpolator 406. The function, however, can be placed in a unit other than the receiving demultiplexer 401.

The demultiplexed outputs for respective output connections are produced through an interface 407.

EMBODIMENT 2

An embodiment 2 will now be described with reference to FIGS. 5A, 5B and 6.

Figure 5B:
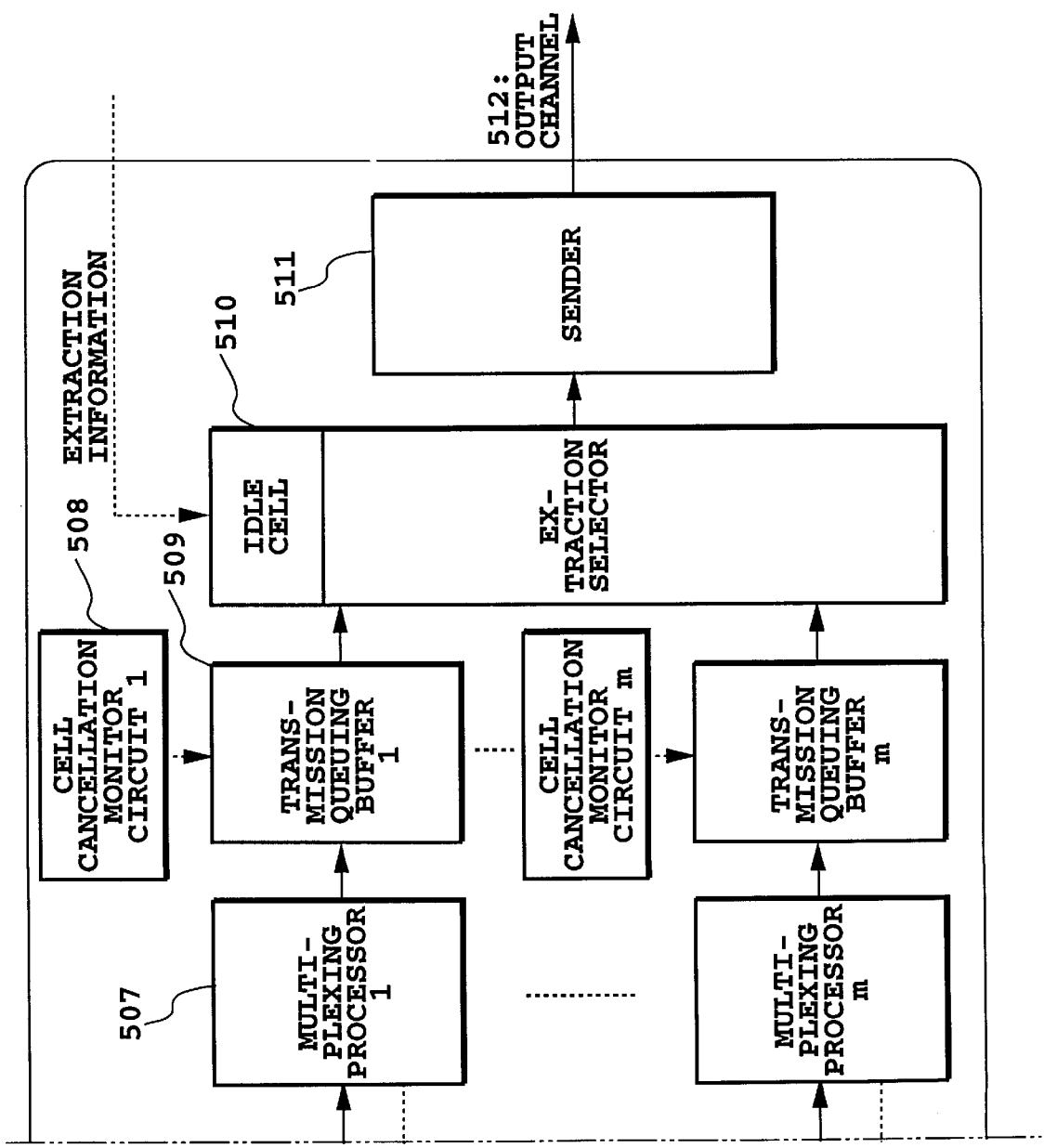

FIGS. 5A and 5B are block diagrams showing the configuration of the embodiment 2 of a multiplex transmitter 501 in accordance with the present invention. FIG. 6 is a flowchart illustrating an example of the buffer selection logic.

Although the embodiment 1 of the multiplex transmitter 201 (see, FIGS. 2A and 2B) uses the fixed number k as a criterion for extracting the micro-frames from the buffers, the embodiment 2 of the multiplex transmitter 501 differs from that in that it employs loadable data lengths onto the next cells, which are provided from multiplexing processors 507. To achieve this, each of the multiplexing processors 507 in the embodiment 2 of the multiplex transmitter 501 can notify of the data length x of the next cell to be multiplexed into the standard ATM cell.

In FIGS. 5A and 5B, extracting circuits 506 and multiplexing processors 507 in the multiplex transmitter 501 differ in operation from their counterparts of the embodiment 1 as shown in FIGS. 2A and 2B. Since the operation of the other circuits is the same as that of the circuits in the multiplex transmitter 201 of FIGS. 2A and 2B, the description thereof is omitted here. The operation of the two sets of circuits 506 and 507 will now be described.

In FIGS. 5A and 5B, the extracting circuits 506 have tolerable multiplexing wait times T1-1–T1-m, and cell cancellation monitor circuits 508 have cell cancellation tolerable times T2-1–T2-m, which are set in advance as in the circuits of the embodiment. 1 as shown in FIGS. 2A and 2B. The times T1 and T2 are values determined in accordance with the system environment and service conditions.

Figure 6:
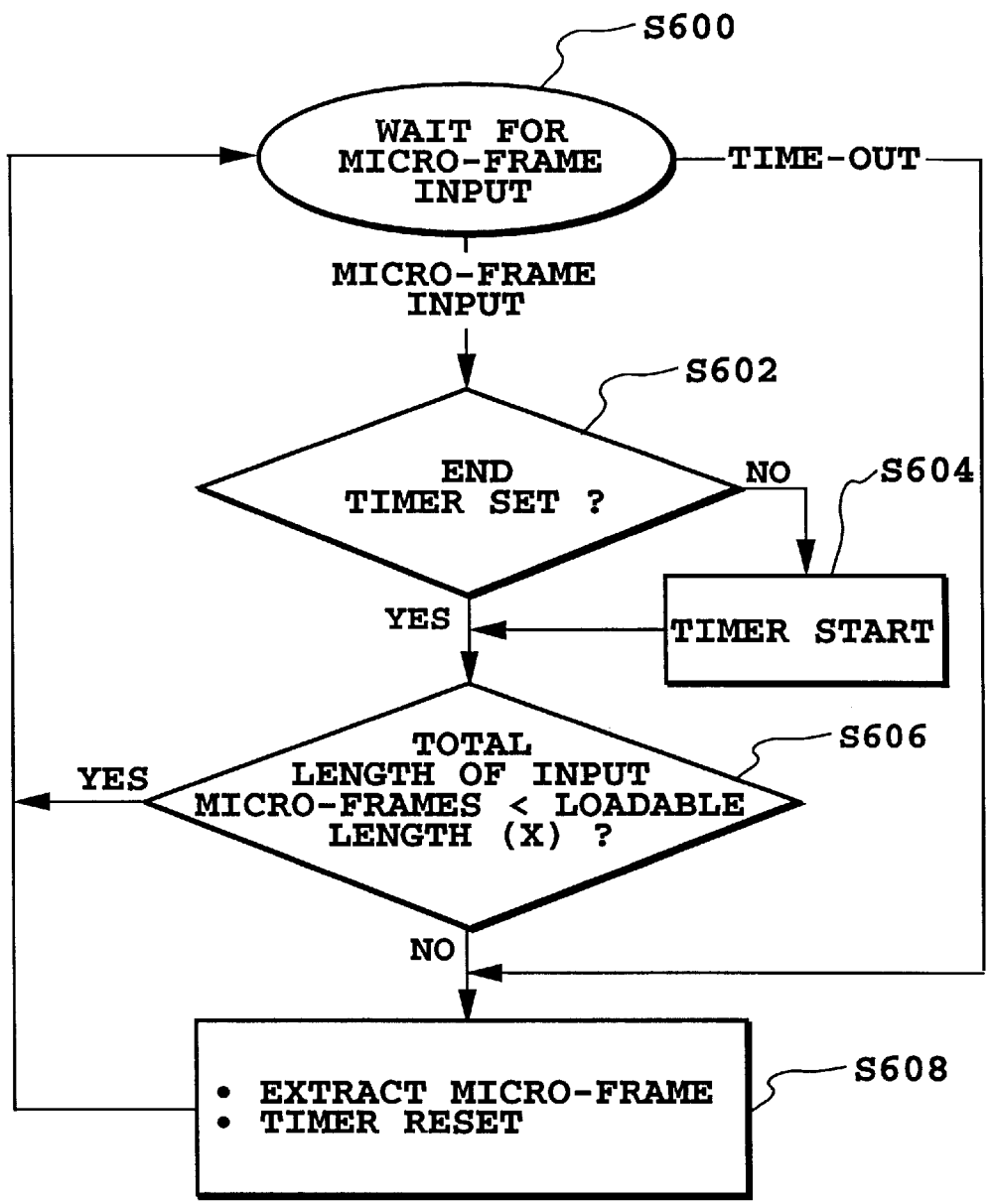
FIG. 6 is a flowchart showing the processing logic of the extracting circuit in the embodiment 2 of the multiplex transmitter.

The flowchart in FIG. 6 shows the extraction processing in the extracting circuits 506, which is similar to that of the extracting circuits 206 in FIG. 3 except for the step (S606) of checking the micro-frames stored in multiplex queuing buffers 505. In this step, each extracting circuit 506 checks the total length of the input micro-frames using the loadable length (x) sent from the corresponding multiplexing processor 507 instead of the fixed number (k) of the micro-frames as shown in the flowchart of FIG. 3.

In this way, keeping monitoring over the corresponding multiplex queuing buffer 505, each extracting circuit 506 extracts the input micro-frames if their total length reaches the loadable length before the dwell time of the first input micro-frame counted from the end of the vacant state of the buffer exceeds the time T1, and transfers the micro-frames to the corresponding multiplexing processor 507. In addition, unless the total length of the input micro-frames exceeds the loadable length when the dwell time passes T1, the extracting circuit 506 transfers the entire input micro-frames to the multiplexing processor 507.

Each multiplexing processor 507 carries out multiplex processing of the received micro-frames in accordance with the predetermined format to transform them into the standard ATM form, and stores it in each transmission queuing buffer 509. Besides, it computes the data length of the micro-frames loadable onto the next ATM cell, and notifies the extracting circuit of it. The length of the data loadable onto the next ATM cell is computed considering an overlapped portion in the case where one of the micro-frames is multiplexed across the current and next ATM cells as in the pattern (3) shown in FIG. 1B, in which case the length of the data loadable onto the next ATM cell surely reduces. Thus, the length of the data loadable onto the next ATM cell is computed and sent to the extracting circuit 506.

Incidentally, if the total length (x) of the micro-frames extracted from each multiplex queuing buffer is determined in advance, the notification from the multiplexing processor 507 is unnecessary.

EMBODIMENT 3

Figure 7:
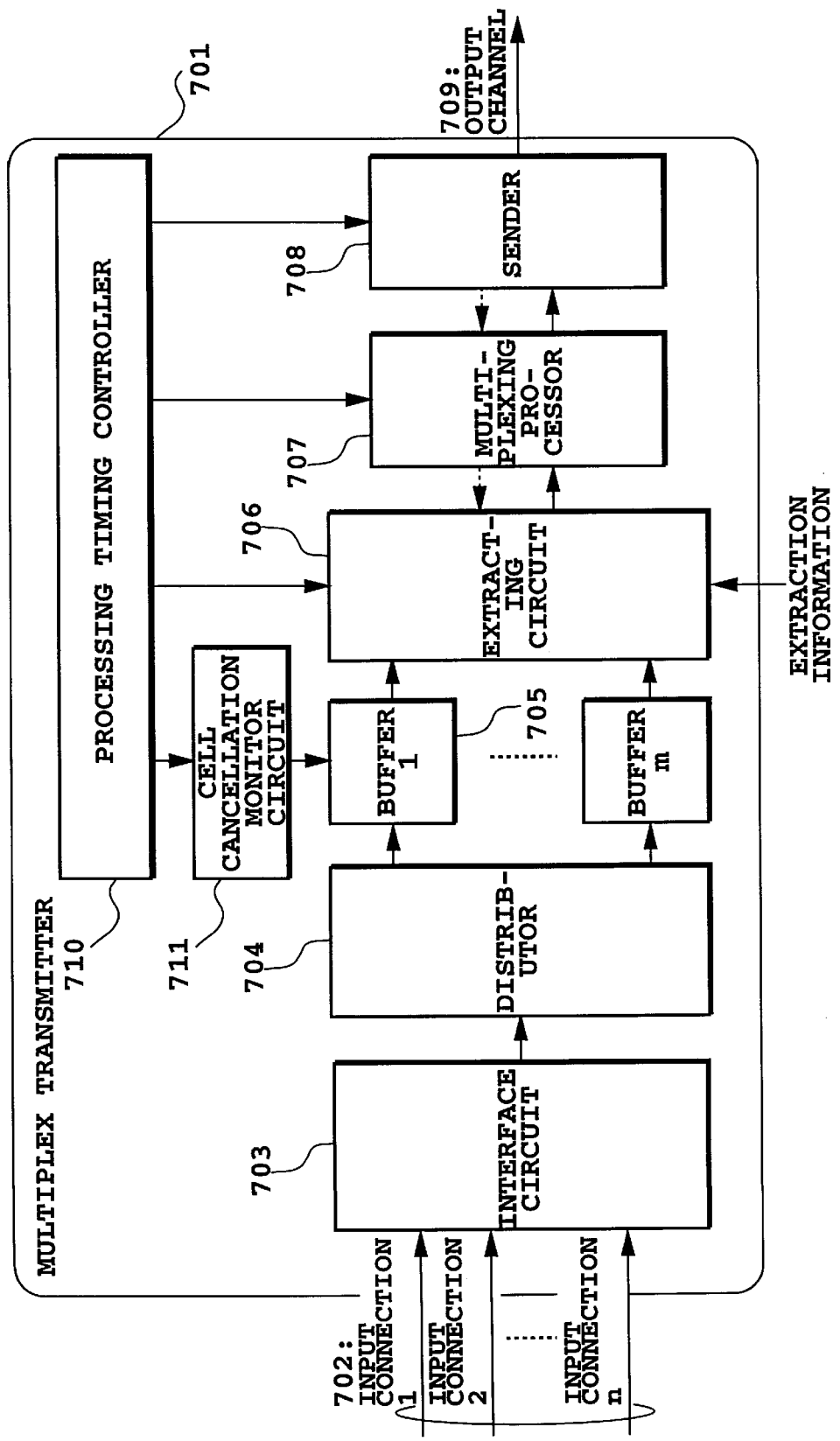
FIG. 7 is a block diagram showing an embodiment 3 of the multiplex transmitter.
Figure 8:
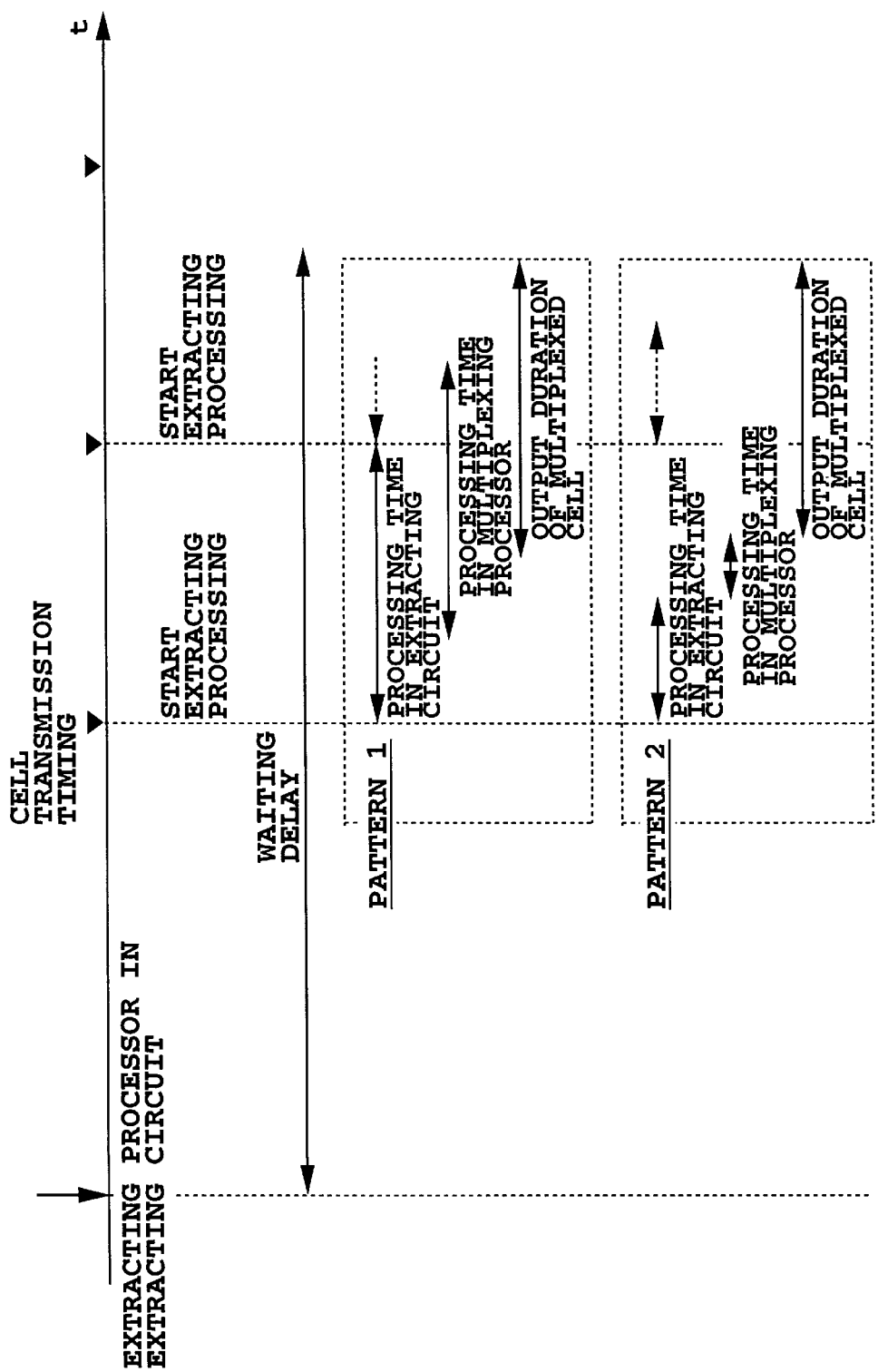
FIG. 8 is a diagram illustrating processing schedules of a processing timing controller in the embodiment 3 of the multiplex transmitter.
Figure 9:
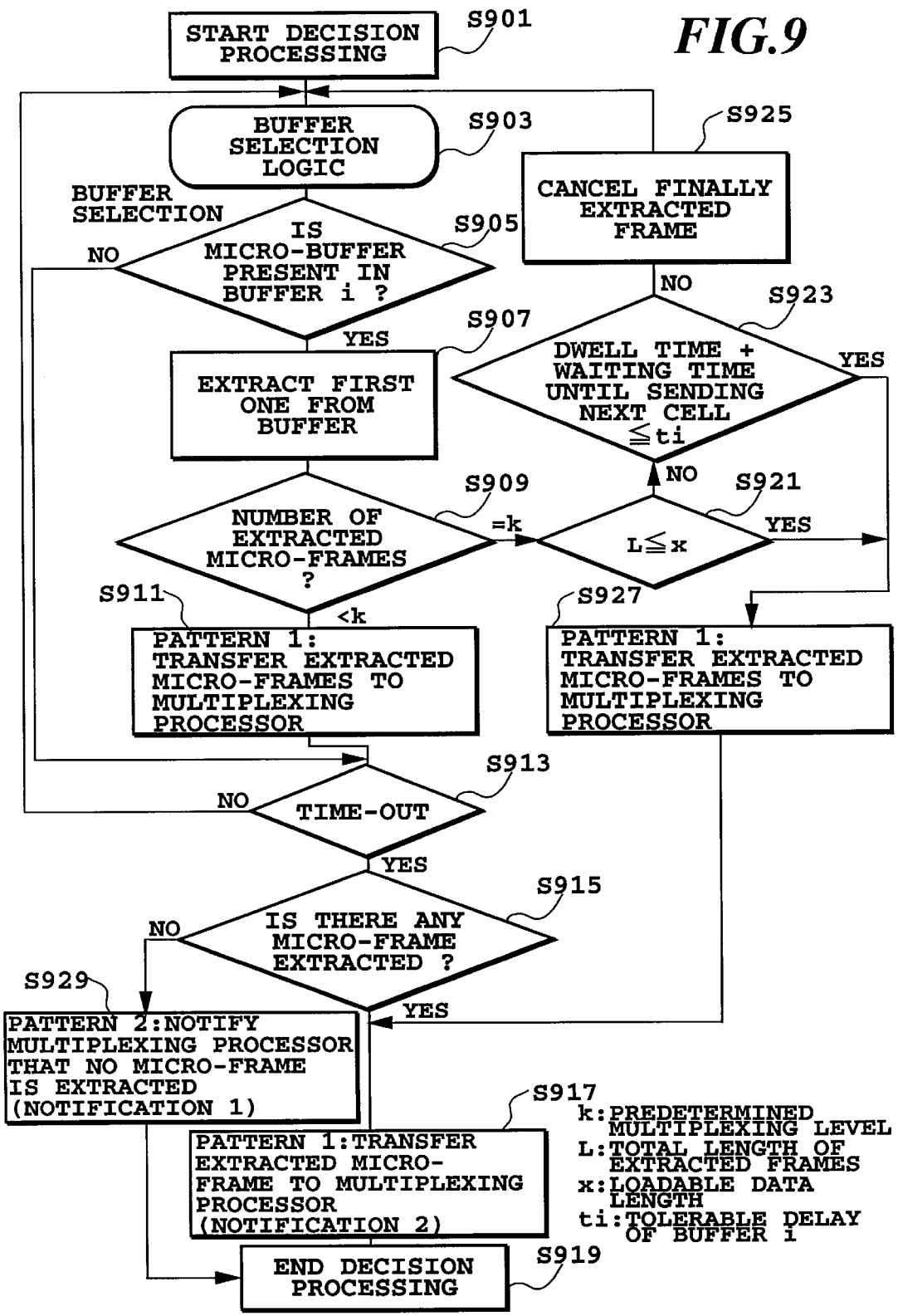
FIG. 9 is a flowchart showing the processing of the extracting circuit in the embodiment 3 of the multiplex transmitter.
Figure 10:
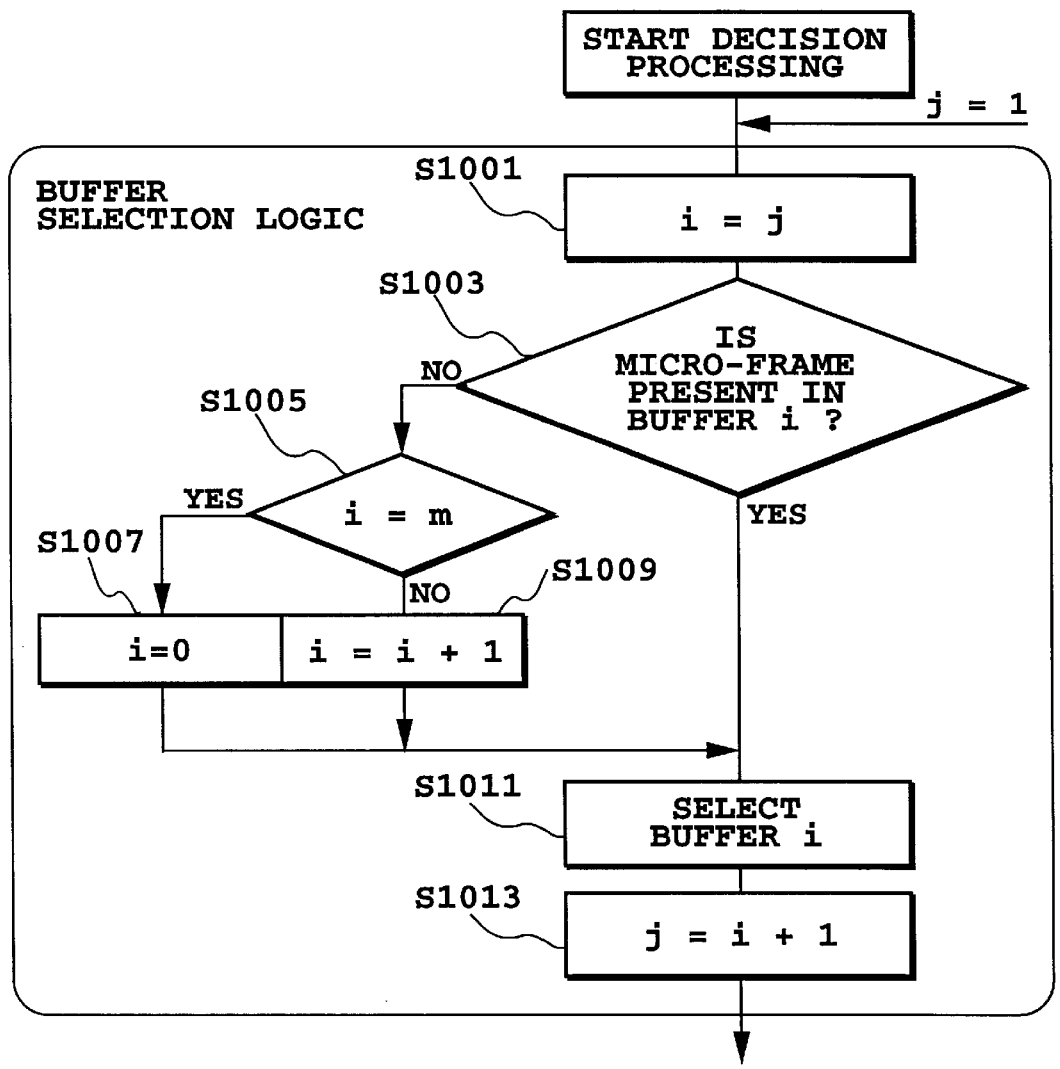
FIG. 10 is a flowchart illustrating an example of buffer selection logic.
Figure 11A:
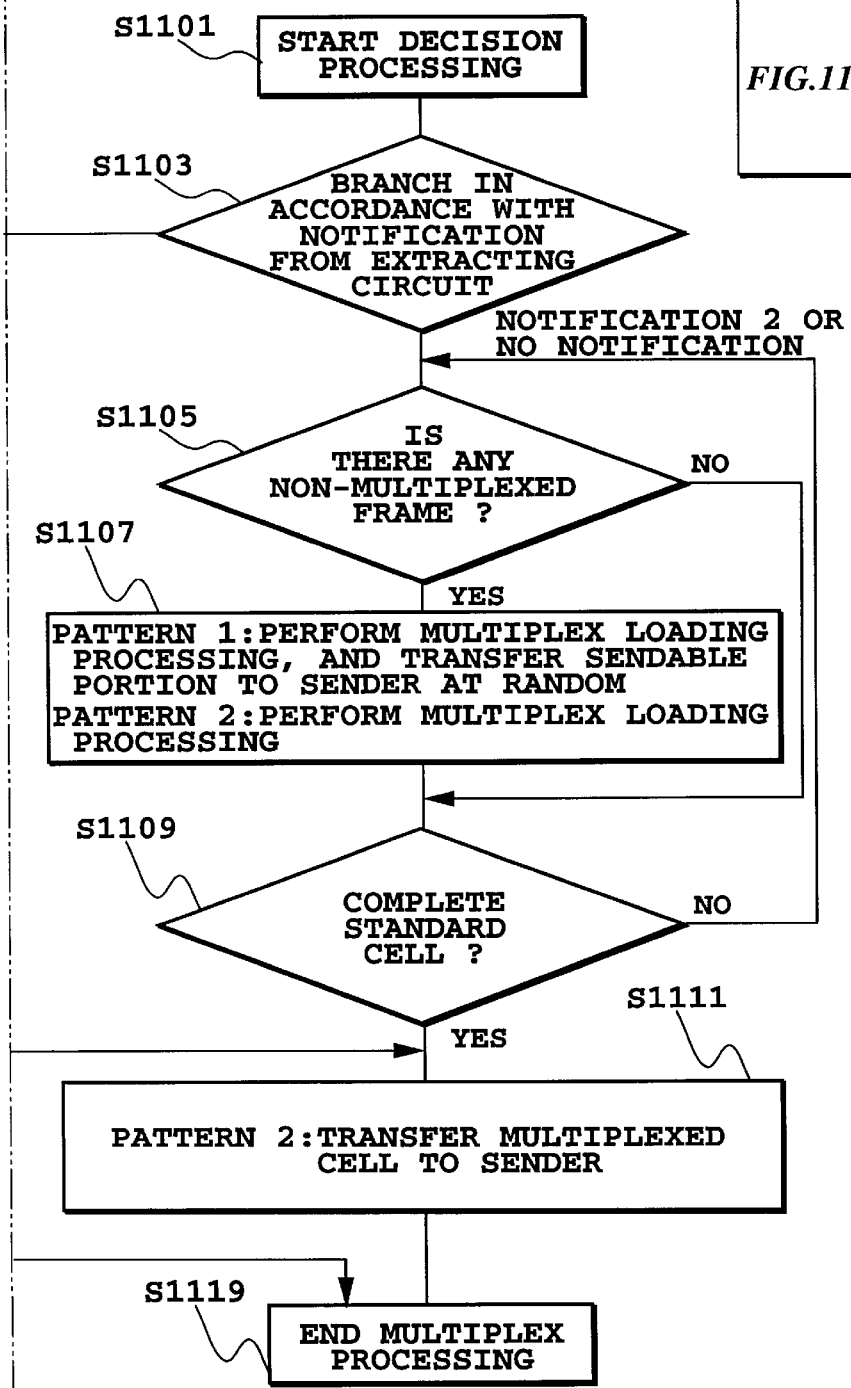
FIGS. 11A and 11B are flowcharts showing the processing logic of the multiplexing processor of an embodiment 4.
Figure 11:
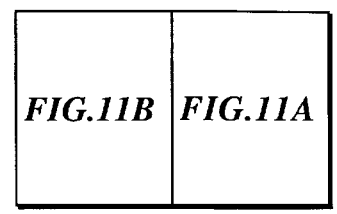
Figure 11B:
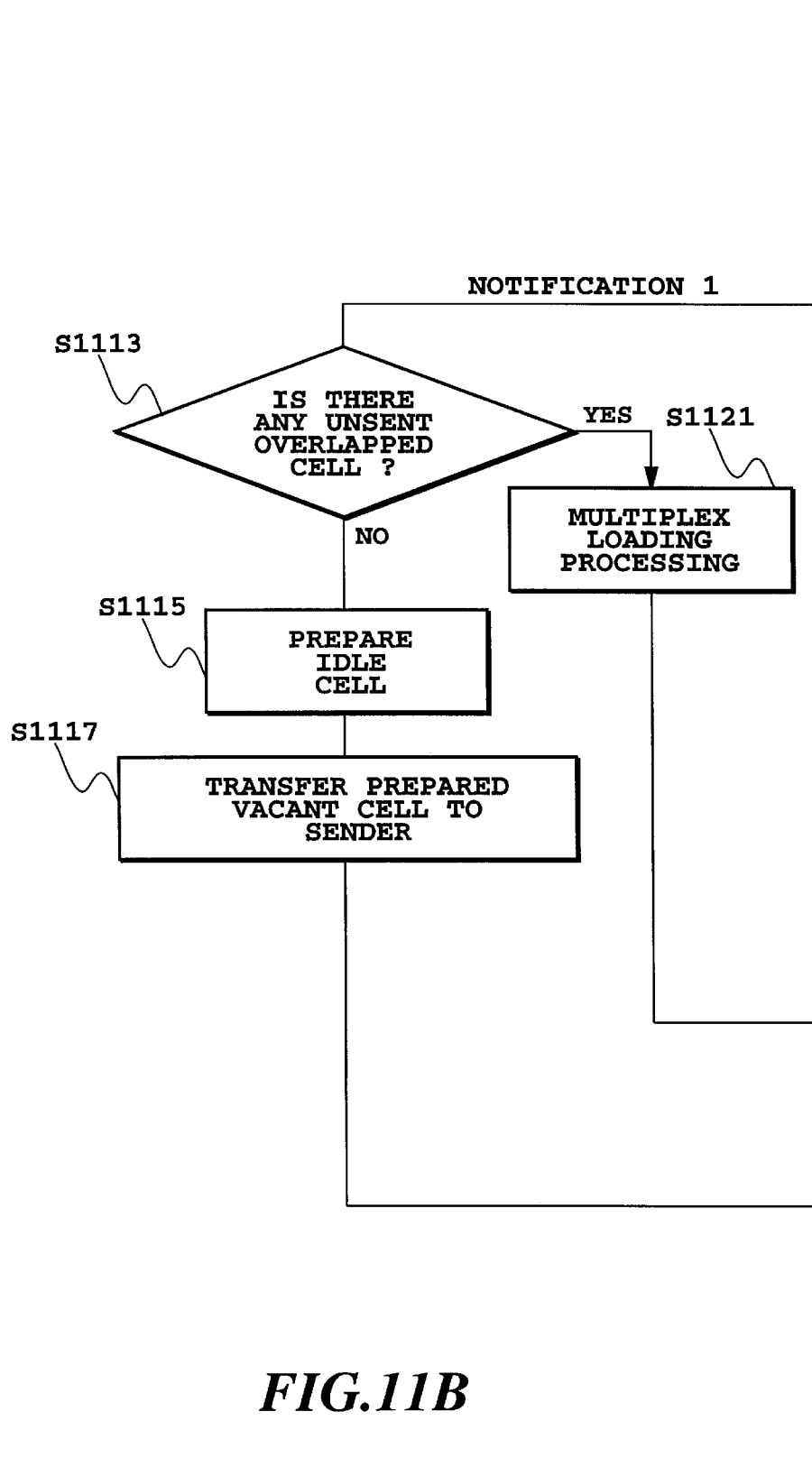

An embodiment 3 will now be described with reference to FIGS. 7–11B. FIG. 7 is a block diagram showing the configuration of an embodiment 3 of a multiplex transmitter 701 in accordance with the present invention. FIG. 8 is a diagram illustrating processing schedules of a processing timing controller 710, FIG. 9 is a flowchart showing the operation of an extracting circuit 706, FIG. 10 is a flowchart showing an example of the buffer selection logic, and FIGS. 11A and 11B are flowcharts showing the processing logic of a multiplexing processor 707.

In the embodiment 3, the multiplex transmitter can handle a micro-frame which overlaps more than one standard ATM cells. It can also handle the micro-frames which do not overlapped. It is a matter of choice whether the overlapped cell is allowed or not.

FIG. 7 shows the configuration of the multiplex transmitter 701. The reference numeral 703 designates an interface circuit that inputs the data connections 1-n in the form of a micro-frame structure. The reference numeral 704 designates a distributor that distributes the micro-frames to m buffers 705 in accordance with the service condition of each micro-frame. The reference numeral 706 designates an extracting circuit that extracts from the m buffers 705 micro-frames to be subjected to the multiplex processing at every processing interval. The reference numeral 707 designates a multiplexing processor that multiplexes the micro-frames extracted by the extracting circuit 706 onto the standard ATM cell or standard ATM cells in accordance with a predetermined scheme or a designated scheme, and 708 designates a sender that sends the processed cell or the idle cell to an output channel 709 in accordance with the standard of the output channel.

The micro-frames in the input data connections 1-n can have a fixed or variable length depending on the connections, or a combination of the fixed and variable lengths can be allowed for the same channel. This embodiment will be described on the assumption that the maximum number of micro-frames which can be multiplexed onto a single standard ATM cell is a fixed number k. The maximum multiplexing number k, which is determined depending on the system environment and service conditions, is decided as one of the service conditions for each connection or micro-frame.

Generally, the service condition is determined for each connection. Hence, the distributing information should be identified connection by connection. Alternatively, the micro-frame itself can each have service information as the distributing information with predetermined format so that the distributor 704 can distribute in accordance with that information. Thus, the distributor 704 selects one of buffers 705 for each micro-frame to be stored, in accordance with the distributing information.

The distributor 704 distributes the input micro-frames in accordance with the distributing information. The distributing information agrees with the service condition of each connection or micro-frame. In the configuration in accordance with the present invention, the distribution can be achieved for each micro-frame or connection by separately assigning in the respective buffers the cancellation tolerable time and micro-frame cancellation ratio as the service conditions, and by notifying the extracting circuit 706 of the extracting procedure that satisfies each service condition.

A cell cancellation monitor circuit 711 manages the input time of each micro-frame to the buffer. This is performed by attaching the input time information to each micro-frame, or by recording it in the memory corresponding to each input micro-frame. The cell cancellation monitor circuit 711 keeps comparing the input times of the micro-frames input to the m buffers 705 with the cancellation times T1-1–T1-m determined in advance as fixed system parameters, and cancels the micro-frames which dwell in the buffers for more than cancellation tolerable times T1-1–T1-m that are values determined depending on the system environment and service conditions.

The transmission rate of the multiplex transmitter is much higher than that of the input connections, and the interface circuit 703 has a conflict control function between the input connections. Thus, all the input micro-frames can be processed in accordance with the input sequence by the interface circuit 703, distributor 704 and the multiplex queuing buffer 205.

A processing timing controller 710 basically provides the respective circuits with processing timings to control the conflicts among the circuits. FIG. 8 illustrates the processing schedules of the circuits controlled by the processing timing controller 710. It is a matter of choice whether the cell output is carried out in the form of direct transfer of each standard ATM cell, or in the form of batch transfer of multiple cells generated like scrambled frames. The cell transfer timings of FIG. 8 is the case of the direct transfer.

The extracting, multiplexing and transfer processings of the extracting circuit 706, multiplexing processor 707 and sender 708 can be achieved either in sequence or in parallel. The sequential processing can be employed only when the time taken for completing the extracting processing of the entire micro-frames to be multiplexed is at least less than or equal to the time taken from the beginning to the end of outputting one ATM cell. On the other hand, the parallel processing of the extracting, multiplexing and transfer processings enables the time taken for completing the extraction of the micro-frames to be postponed after the beginning of the multiplexed cell transfer.

In the following description in connection with FIGS. 8 and 9, pattern 1 refers to the parallel processing of the extracting, multiplexing and transfer processings, and pattern 2 refers to the sequential processings thereof.

The extracting circuit 706 extracts the micro-frames from the buffers 1-m, and transfers the micro-frames to be multiplexed to the multiplexing processor 707. The extracting processing from the buffers 705 by the extracting circuit 706 will now be described with reference to the time chart of FIG. 8 and the flowchart of FIG. 9. In FIGS. 8 and 9, the processings designated by pattern 1 and pattern 2 are carried out only for the pattern 1 and pattern 2, respectively.

In the flowchart of FIG. 9, the fundamental extracting processing is to select the buffer i from which the micro-frames are to be extracted (S903), and to continue micro-frame collecting processing until the number of extracted micro-frames reaches the multiplexed number k (S909) or until time-out (S913).

In the case of pattern 1, the micro-frames are extracted one by one, and transferred to the multiplexing processor 707 (S911 and S927).

In the case of pattern 2, if no micro-frame is collected (NO at S915) until the end of the processing time (YES at S913), notification 1 (no micro-frame is present) is sent to the multiplexing processor 707 (S929). In addition, in pattern 2, if there is at least one micro-frame at the time-out, or k micro-frames are collected, notification 2 (micro-frame is present) is transferred together with the entire micro-frames collected (S917).

In the flowchart of FIG. 9, if the finally extracted micro-frame is an overlapping frame, and its dwell time plus a time period until the frame of the latter half of the overlapping frame has been transmitted is greater than the tolerable time ti of the buffer, the finally extracted frame is canceled to maintain the transmission quality against delay (S923 and s925).

Several selection logics (S903) of the buffer in FIG. 9 are conceivable as follows, for example.

1. A method that selects each one cell from the first to m-th buffers cyclically.
2. A method that extracts from each buffer until the buffer becomes vacant in accordance with the predetermined sequence of the buffers, and then transfers to the next buffer.
3. A method that selects each one of the buffers randomly.
4. A method that counts the number of the cells extracted from each buffer so that the cells are extracted evenly.
5. A method that attaches weight to the ratios of the extracted numbers in the foregoing methods.
6. A method that combines the foregoing methods.

If only one buffer is used, the buffer i in FIG. 9 is fixed.

FIG. 10 illustrates an example of the buffer selection logic. The processing illustrated in FIG. 10 is an example of the foregoing method 1 extracting each cell cyclically from the first to m-th buffer.

In FIG. 10, the buffer selection logic is started with the value i of the buffer being set at its initial value 1 at the beginning of the decision processing. If there is any micro-frame in the buffer i (YES at S1003), the processing proceeds to the next step without changing the number i of the selected buffer. If there is not any micro-frame in the buffer (NO at S1003), the processing proceeds to the next step after selecting the next buffer (S1005, S1007 and S1009). If the micro-frame in a particular buffer is exhausted in this way, the processing proceeds to the next buffer.

In addition to carrying out a different service for each buffer, a method is conceivable which dynamically changes, by using the multiplexing processor 707, the multiplexing method for each buffer which has stored the extracted micro-frame. In this case, it is necessary for the multiplexing processor 707 to further possess a function to conduct negotiation with the receiving node for demultiplexing the standard ATM cell connections in accordance with the multiplexing schemes so that thus standard ATM cell connections are demultiplexed in accordance with the multiplexing schemes used in the multiplex processing, or a function to generate multiplexed cells including information on multiplexing schemes which have been determined in advance between the multiplexing processor 707 and the receiving node.

FIGS. 11A and 11B are flowcharts illustrating the processing of the multiplexing processor 707 when the multiplexing scheme is limited to a single method. The multiplexing processor 707 carries out the processing designated by pattern 1 and pattern 2 in FIGS. 11A and 11B only in the case of the pattern 1 and pattern 2, respectively.

The processing is branched in response to the notification from the extracting circuit 706 (S1103). If notification 1

(indicating that there is no cell to be extracted) is received in the case of pattern 1, and there is no overlapping (NO at S1113), the idle cell is selected to adjust transmission rate (S1115). Otherwise, the multiplexing processor 707 multiplexes the micro-frame onto the standard cell in accordance with the predetermined multiplexing method (S1107 and S1121).

The idle cell or the multiplexed cell is transferred to the sender 708 to be transmitted: In pattern 1, it is transferred by every sendable portion in accordance with the timing of the sender 708 (S1107); and in pattern 2, it is transferred by every multiplexed standard ATM cell (S1117 and S1111).

EMBODIMENT 4

An embodiment 4 is shown in FIGS. 12–14B.

Figure 12:
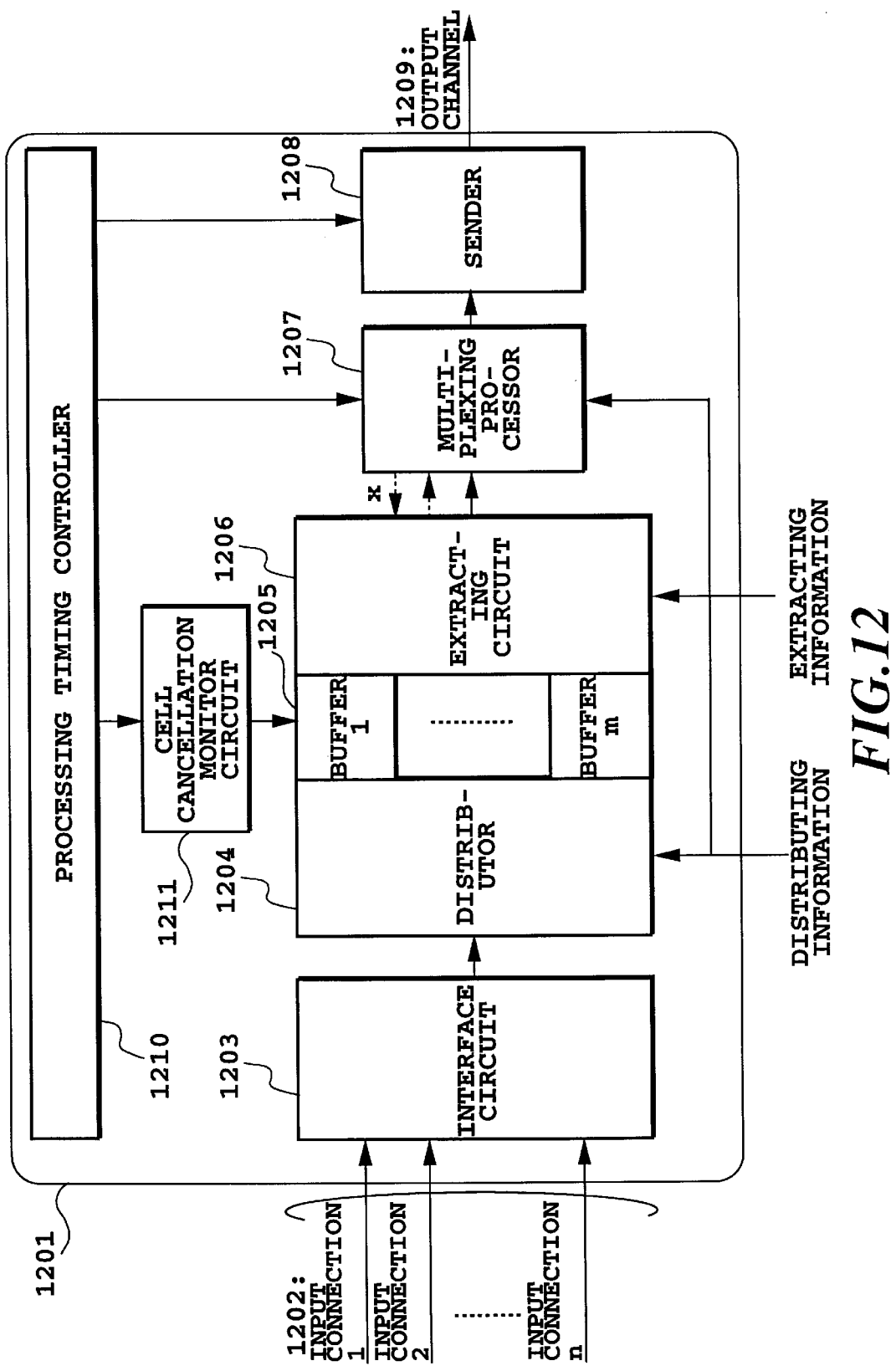
FIG. 12 is a block diagram showing the embodiment 4 of the multiplex transmitter.
Figure 13:
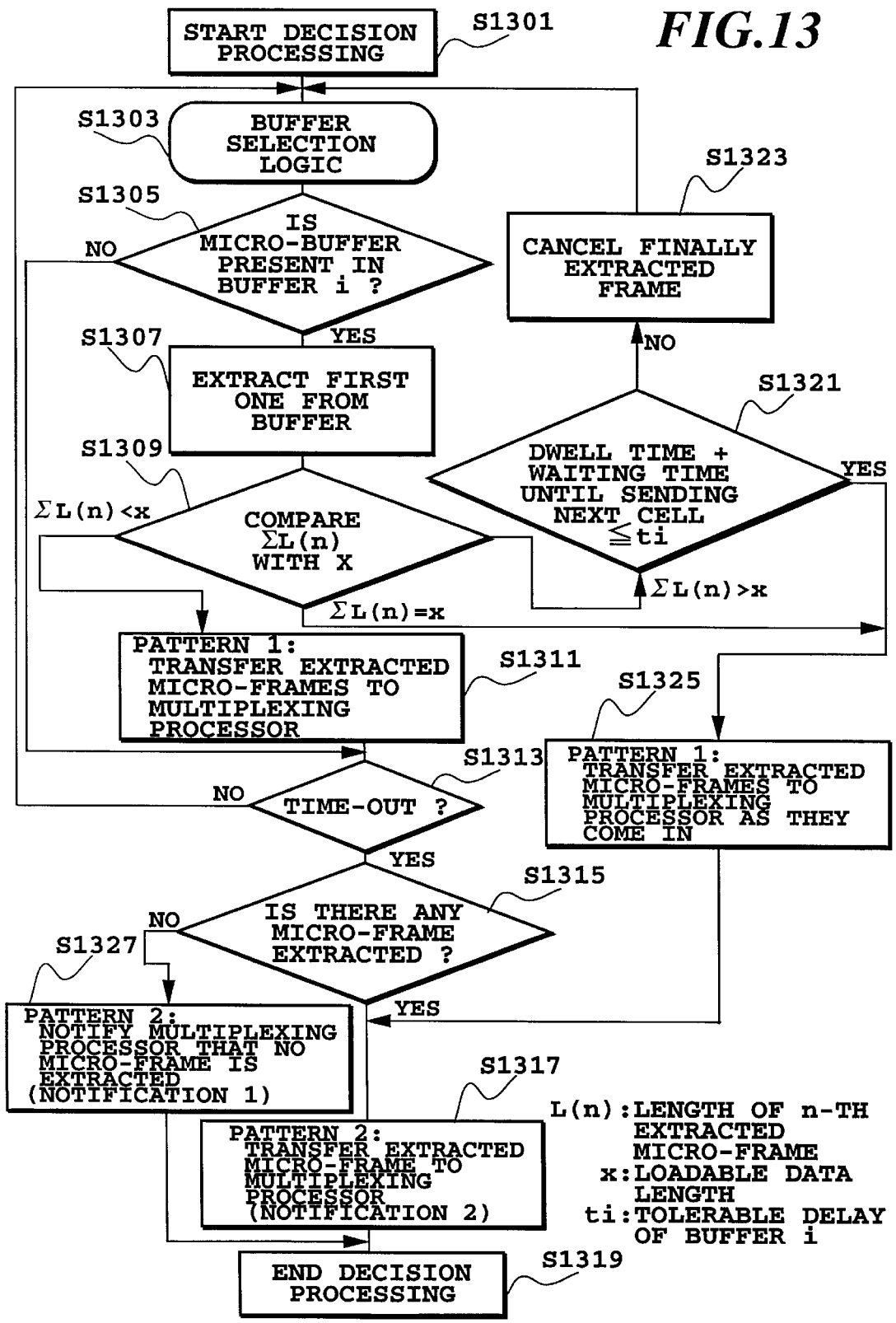
FIG. 13 is a flowchart showing the processing logic of the extracting circuit in the embodiment 4.
Figure 14A:
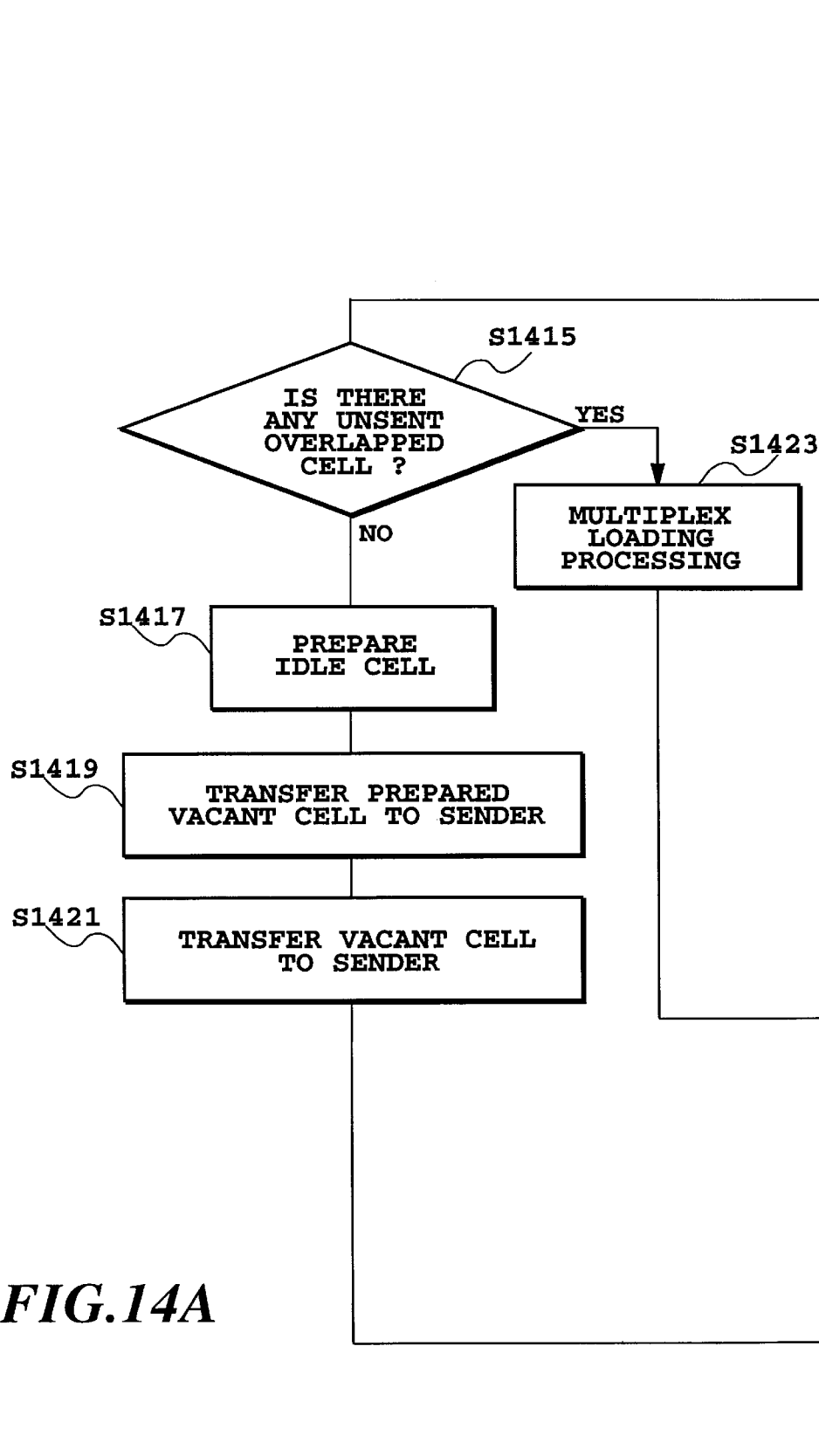

FIG. 12 is a block diagram showing the configuration of the embodiment 4 of a multiplex transmitter 1201 in accordance with the present invention. FIG. 13 is a flowchart illustrating the processing logic of an extracting circuit 1206, and FIGS. 14A and 14B are flowcharts illustrating the processing logic of a multiplexing processor 1207. The embodiment 4 of the multiplex transmitter in accordance with the present invention will now be described referring to FIGS. 12–14B.

Although the foregoing embodiment 3 uses the fixed number k as a criterion for the number of the micro-frames to be extracted from the buffers, the embodiment 4 differs from that in that it employs loadable data length x onto the next cell, which is provided from the multiplexing processor 1207. To achieve this in the embodiment 4, the multiplexing processor 1207 notifies an extracting circuit 1206 of the data length x that can be multiplexed into the next standard ATM cell to be subjected to the multiplex processing.

The extracting circuit 1206 and multiplexing processor 1207 in the embodiment 4 of the multiplex transmitter 1201 as shown in FIG. 12 differ in operation from their counterparts of the embodiment 2. Since the operation of the other circuits is the same as that of the embodiment 3, only the operation of the two circuits will be described, omitting the description of the other circuits.

In the multiplex transmitter 1201 as shown FIG. 12, there are also processings for the pattern 1 and pattern 2 described in connection with FIG. 8.

The extracting circuit 1206 in FIG. 12 extracts the micro-frames from the buffers 1-m in accordance with the processing timing as in the embodiment 3, and transfers the micro-frames to be multiplexed to the multiplexing processor 1207. Although the criterion for the number of micro-frames to be extracted from the buffer is a fixed number k in the embodiment 3, the embodiment 4 uses the loadable data length x to the next cell, which is sent from the multiplexing processor 1207.

The multiplexing processor 1207 decides the overlapping loading onto the next term cell, or the prolonged loading of the micro-frame extracted at the present timing onto the next timing cell, while carrying out the loading processing in accordance with a predetermined loading method, and detects the loadable data length to the next term cell. The multiplexing processor 1207 notifies the extracting circuit 1206 of the loadable data length x.

The operation of the extracting circuit 1206 will now be described in more detail with reference to the flowchart of FIG. 13. In the processing, the processings designated by pattern 1 and pattern 2 are each carried out only for the pattern 1 and pattern 2 cases, respectively.

The extracting circuit 1206 selects one of the buffers 1205 (S1303), and extracts a micro-frame (S1307). The selection logic of the buffer for the extraction is the same as that described in the flowchart of FIG. 10, for example.

The accumulated data length $\Sigma L(n)$ of the extracted micro-frames is compared with the data length x fed from the multiplexing processor 1207 (S1309). The extraction continues until the accumulated data length exceeds x, or the extraction processing time elapses (S1313). The notifications 1 and 2 to the multiplexing processor 1207 have the same meaning as in the embodiment 3.

When the accumulated data length of the extracted micro-frames exceeds x, and hence the extracting circuit 1206 decides the overlapping loading onto the next cell as shown at S1309 in the flowchart of FIG. 13, the dwell time of the finally extracted micro-frame in the buffer i plus the time period until the transfer of the next cell is compared with the cancellation tolerable time ti of the buffer i as in the embodiment 2 (S1321). If it exceeds the cancellation tolerable time ti, the finally extracted micro-frame is canceled (S1323), and the extracting processing is continued.

Although the extracting circuit 1206 makes the branching by simply comparing the accumulated data length with x in this embodiment, the accumulated data length can be determined taking account of a data amount added in proportion to the number of multiplexed micro-frames during their multiplexing.

FIGS. 14A and 14B show the flowchart of the processing logic of the multiplexing processor 1207. The processing branches depending on the notification from the extracting circuit 1206 (S1403). In the case of notification 1, if there is no cell to be extracted and no overlapped residual data to be sent (NO at S1415), the idle cell is selected (S1417) to adjust transmission rate. Otherwise, the multiplexing processor 1207 carries out the micro-frame multiplexing onto the standard cell in accordance with the predetermined multiplexing method (S1407). In addition, it detects the accumulated loadable data length x onto the next term cell by comparing the data amount loadable in the next term with the residual data amount of the overlapping, and notifies the extracting circuit 1206 of the x (S1411). Furthermore, in the case of pattern 2, the idle cell or the multiplexed cell is transferred to a sender 1208 in accordance with the timing of the sender 1208 (S1413) and is transmitted.

In the case of pattern 1, sendable portions are transferred to the sender 1208 at their occurrence (S1407).

The foregoing embodiments 3 and 4 employs only one set of buffers instead of two sets of buffers consisting of the multiplex queuing buffers and transmission queuing buffers of the embodiments 1 and 2. This enables the multiplex transmitter to reduce the delay therein, and micro-frames of different service types to be multiplexed onto the same ATM cell.

EMBODIMENT 5

Figure 15A:
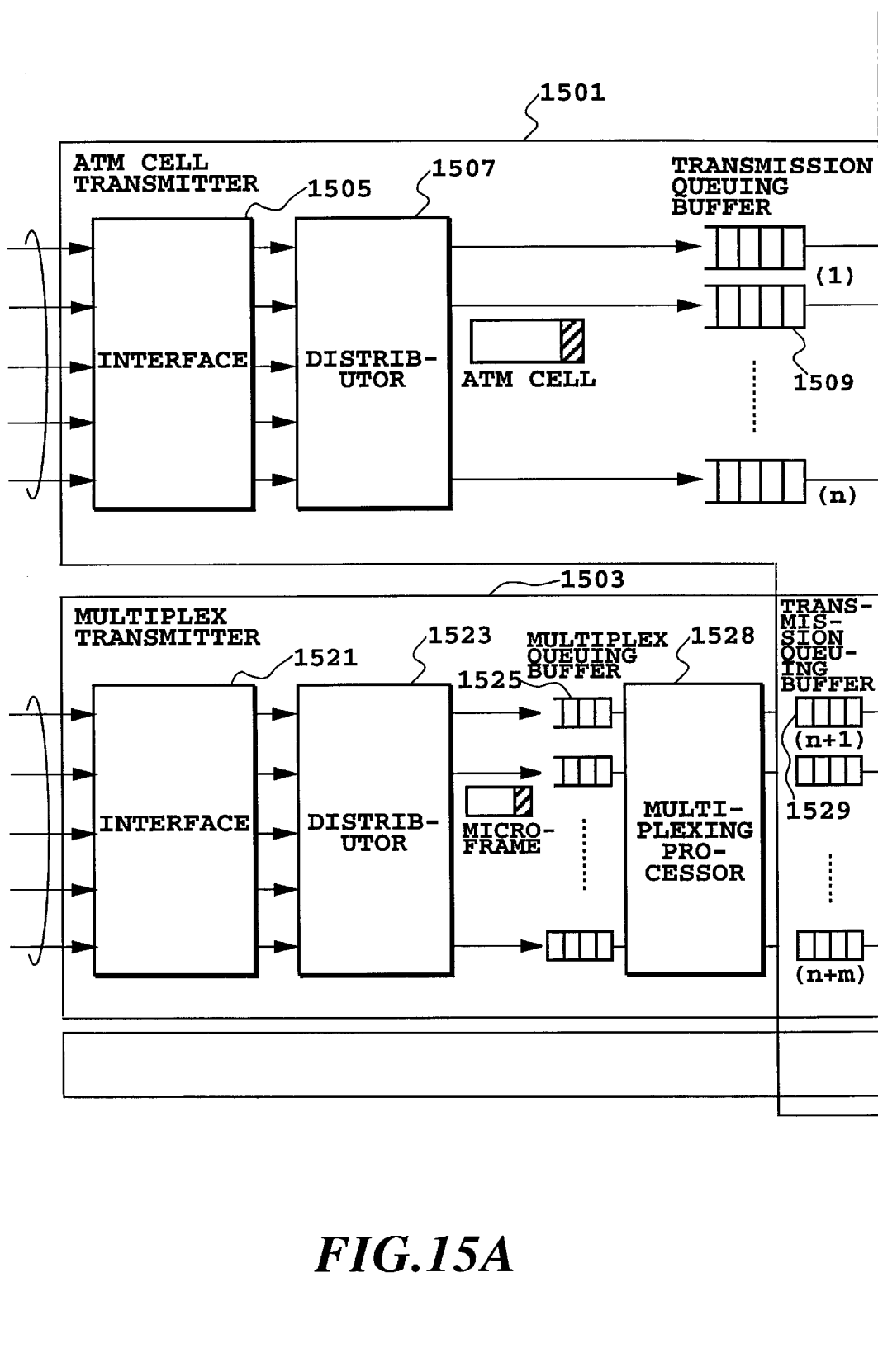
Figure 16A:
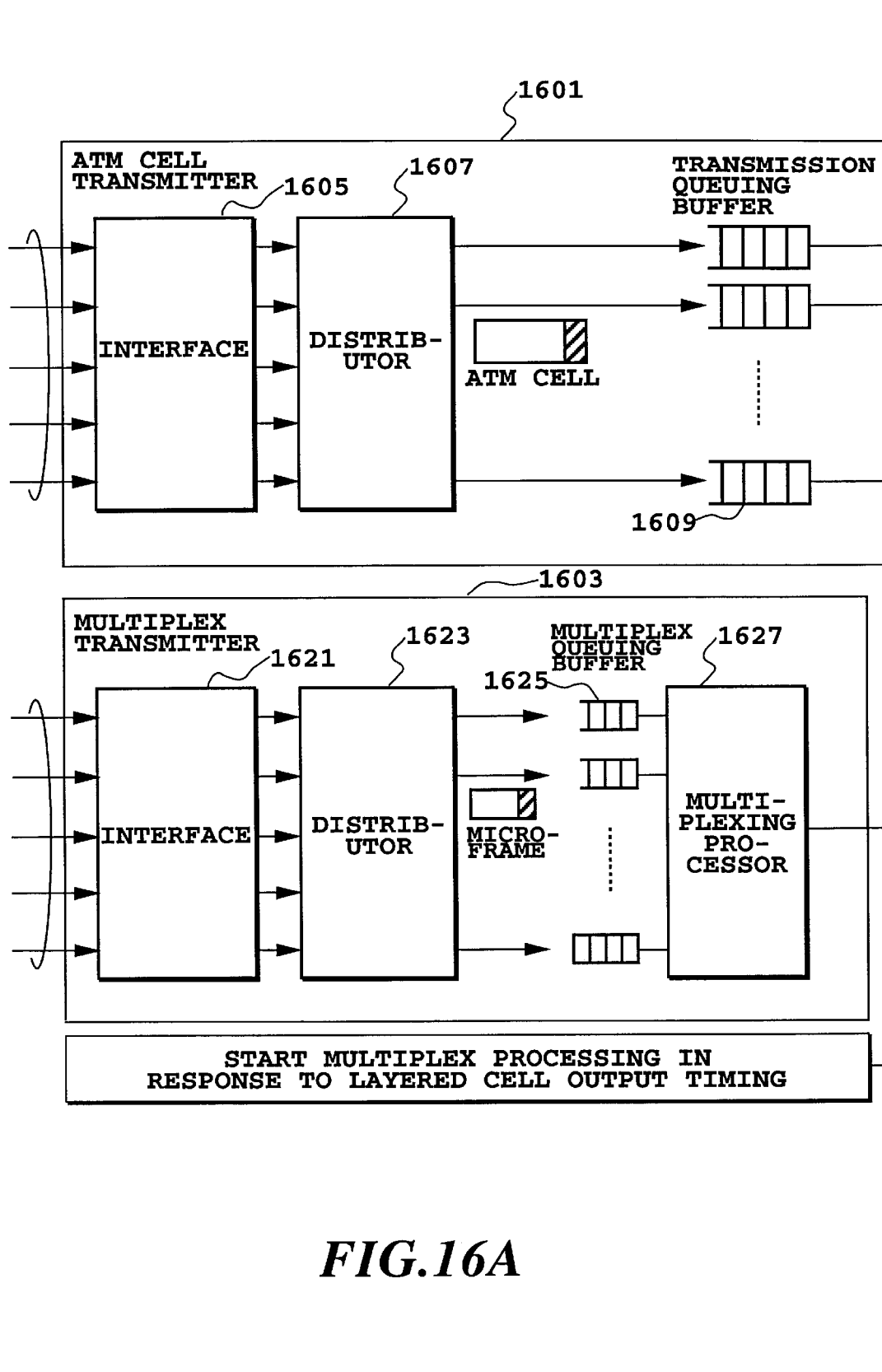
Figure 17:
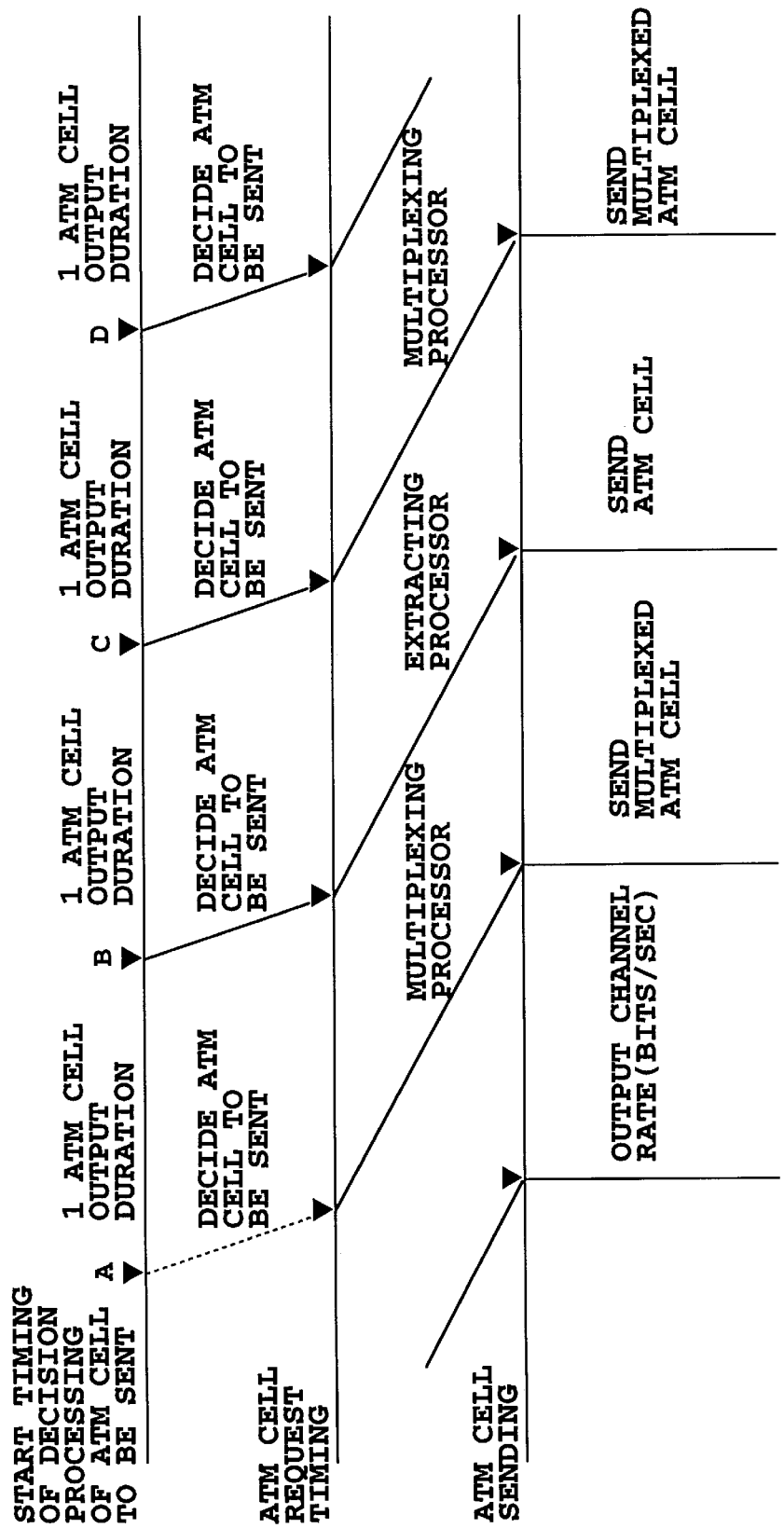
FIG. 17 is a diagram illustrating timings of the second ATM cell transmitter of the embodiment 5.

FIGS. 15A–17 show an embodiment 5. FIGS. 15A, 15B, 16A and 16B are block diagrams each showing a configuration of an ATM cell transmitter of the embodiment 5 in accordance with the present invention. FIG. 17 is a time chart illustrating the processing timings associated with an ATM cell transmitter 1601 as shown in FIGS. 16A and 16B.

An ATM cell transmitter 1501 shown in FIGS. 15A and 15B simultaneously controls the micro-frame multiplexed ATM cells, which are delivered from a multiplex transmitter 1503 having the same configuration as its counterparts of the embodiment 1 or 2 of the present invention as shown in FIGS. 1A–6, and standard ATM cells which are input to an interface 1505 of the ATM cell transmitter 1501, and sends them to the output channel.

The ATM cells input through the interface 1505 are distributed by a distributor 1507 in accordance with the service types of the connections, and are stored in transmission queuing buffers 1509.

The multiplex transmitter 1503 has the same configuration as those described in connection with FIGS. 1A–6. Accordingly, the micro-frames input to an interface 1521 are multiplexed through a distributor 1523, a multiplex queuing buffers 1525, and a multiplexing processor 1528, and are stored into transmission queuing buffers 1529 as the ATM cells.

The distribution accords with the service condition of each connection or ATM cell. Since the service condition is generally determined connection by connection, the distributor distributes the connections individually. Alternatively, the distributor distributes the ATM cells or micro-frames using the distributing information attached to each of them, and stores them in the buffers.

An extraction selector 1511 collectively manages the reading of the transmission queuing buffers 1509 and 1529, and selects the ATM cells stored in the buffers 1509 and 1529 in an appropriate extracting order, thereby sequentially outputting them to the output channel through a sender 1513.

The extraction selector 1511 extracts the ATM cells from the transmission queuing buffers 1509 in accordance with predetermined logic provided by external selection information, and delivers them to the sender 1513. Several logics for selecting the ATM cell are conceivable as follows, for example.

1. A method that selects each one cell from the first to n+m-th buffers cyclically.

2. A method that extracts from each buffer until the buffer becomes vacant in accordance with the predetermined sequence of the buffers, and then transfers to the next buffer.

3. A method that selects each one of the buffers randomly.

4. A method that counts the number of the cells extracted from each buffer so that the cells are extracted evenly.

5. A method that attaches weight to the ratios of the extracted numbers in the foregoing methods.

6. A method that combines the foregoing methods.

If there is no cell to be extracted, a idle cell is selected and sent to adjust transmission rate. The extraction selector 1511 transfers the cells to the sender 1513 according to the cell transmission timing of the sender 1513.

FIGS. 16A and 16B shows an ATM cell transmitter 1601 which simultaneously controls the micro-frame multiplexed ATM cells, which are delivered from a multiplex transmitter 1603 having the same configuration as its counterparts of the embodiment 3 or 4 of the present invention as shown in FIGS. 7–14B, and standard ATM cells which are input to an interface 1605 of the ATM cell transmitter 1601, and sends them to the output channel.

The ATM cell transmitter 1601 as shown in FIGS. 16A and 16B differs from the ATM cell transmitter 1501 in that the buffers controlled by an extraction selector 1611 in the multiplex transmitter 1603 are multiplex queuing buffers.

As described above, the multiplex transmitters in the embodiments 3 and 4 do not use the transmission queuing buffers. For this reason the extraction selector 1611 controls two sets of buffers of different levels, that is, transmission queuing buffers 1609 storing the ATM cells, and multiplex queuing buffers 1625 storing the micro-frames.

The relationships between timings will be described of the extraction selector 1611 and a multiplexing processor 1627 with reference to FIG. 17. With regard to the timings of the extraction selector 1611 in FIG. 17, the unit time for processing the ATM cell is determined from the channel rate available for transmitting a single ATM cell from the sender. The unit time thus determined is the one ATM cell output duration in FIG. 17, which is equal to 53×8/output channel (bits/sec). The multiplex transmitter 1603 carries out the extracting processing and multiplex processing such that they have been completed within the one ATM cell output duration as described before in connection with FIG. 8 (pattern 2). Thus, controlling the processing such that the selection of the buffers subjected to the multiplex processing is carried out simultaneously with the processing of the transmission queuing buffers enables the selection control of both types of the buffers to be handled in the same fashion. FIG. 17 illustrates this.

As the logic for selecting the buffers, the methods 1–5 described above can be used, for example.

While the present invention has been described in detail with respect to the foregoing embodiments 1–5, it will be understood that numerous modifications, changes, and variations will be made of these embodiments without departing from the scope of the invention.

As described above, the present invention provides the concrete system configuration for achieving multiplex loading onto standard ATM cells a plurality of connections consisting of micro-frames including data shorter than the standard ATM cells which are proposed in various fashions.

The multiplex transmitters can achieve efficient multiplex transmission processing while maintaining the quality of individual micro-frames having several tolerable wait times or micro-frame cancellation ratios. In addition, it is possible to implement the processing with a minimum delay, and to achieve the multiplexing of micro-frames with different service qualities onto one ATM cell by incorporating into one queue delay, two queue delays, that is, the delay involved in selection and multiplex of the micro-frames, and the delay involved in waiting for transmission.

Moreover, it is possible to improve the channel efficiency and to achieve finer transmission control for maintaining the quality by handling the standard ATM cells and the ATM cells loaded with the micro-frames in the same manner.

What is claimed is:

1. A multiplex transmitter for performing multiplex transmission by loading a standard ATM cell with multiplexed connections comprising micro-frames each including data shorter than the standard ATM cell, said multiplex transmitter comprising:

multiplex queuing buffers for storing input micro-frames;

an extracting portion for extracting entire micro-frames in the multiplex queuing buffers when a predetermined extracting time comes as determined by a timer set upon arrival of a first input micro-frame, or when a number of the micro-frames in each of said multiplex queuing buffers reaches a predetermined number;

a multiplexing processor for carrying out multiplex processing onto the standard ATM cell in accordance with a predetermined multiplexing scheme, a transmission queuing buffer for storing the standard ATM cell;

a cell cancellation monitor portion for canceling a cell whose dwell time in the transmission queuing buffer reaches a predetermined canceling time;

an extracting portion for extracting the standard ATM cell from the transmission queuing buffer; and a sender for transferring an extracted standard ATM cell to an output channel.

2. A multiplex transmitter for performing multiplex transmission by loading a standard ATM cell with multiplexed connections comprising micro-frames each including data shorter than the standard ATM cell, said multiplex transmitter comprising:

multiplex queuing buffers for storing input micro-frames;

an extracting portion for extracting entire micro-frames in each of the multiplex queuing buffers;

a multiplexing processor for carrying out multiplex processing onto the standard ATM cell in accordance with a predetermined multiplexing scheme, and notifying said extracting portion of the data length loadable onto a next ATM cell, said extracting portion extracting the entire micro-frames in each of the multiplex queuing buffers when a predetermined extracting time comes as determined by a timer set upon arrival of a first input micro-frame, or when a total length of the micro-frames in each of said multiplex queuing buffers reaches the data length notified by said multiplexing processor;

a transmission queuing buffer for storing the standard ATM cell;

a cell cancellation monitor portion for canceling a cell whose dwell time in the transmission queuing buffer reaches a predetermined canceling time;

an extracting portion for extracting the standard ATM cell from the transmission queuing buffer; and a sender for transferring an extracted standard ATM cell to an output channel.

3. The multiplex transmitter as claimed in claim 1 or 2, wherein there are provided parallel circuits each including said multiplex queuing buffers, said first mentioned extracting portion, said multiplexing processor, and said transmission queuing buffer, and wherein there is further provided a distributor for distributing said input micro-frames, said distributor distributing said input micro-frames to said multiplex queuing buffers having different multiplexing schemes in accordance with predetermined services conditions.

4. The multiplex transmitter as claimed in claim 3, wherein said multiplexing processor determines extracting order from said buffers in accordance with the service conditions, extracts the micro-frames, and selects the multiplexing scheme in accordance with the service conditions.

5. A multiplex transmitter for performing multiplex transmission by loading a standard ATM cell with multiplexed connections comprising micro-frames each including data shorter than the standard ATM cell, said multiplex transmitter comprising:

a plurality of buffers for storing input micro-frames;

a cell cancellation monitor portion for storing each input micro-frame into one of the buffers, for monitoring a dwell time of each of the input micro-frames in the transmitter, and for canceling a micro-frame which dwells in one of the buffers for more than a predetermined canceling time;

an extracting portion for successively extracting from the buffers the micro-frames in accordance with their input order, a number of the extracted micro-frames being limited within a predetermined number;

a multiplexing processor for carrying out multiplex processing onto the standard ATM cell in accordance with a predetermined multiplexing scheme;

a sender for transferring an extracted standard ATM cell to an output channel; and a processing timing control circuit for controlling and coordinating processing timings of said extracting portion, said multiplexing processor and said sender.

6. A multiplex transmitter for performing multiplex transmission by loading a standard ATM cell with multiplexed connections comprising micro-frames each including data shorter than the standard ATM cell, said multiplex transmitter comprising:

a plurality of buffers for storing input micro-frames;

a cell cancellation monitor portion for storing each input micro-frame into one of the buffers, for monitoring a dwell time of each of the micro-frames in the transmitter, and for canceling a micro-frame which dwells in one of the buffers for more than a predetermined canceling time;

an extracting portion for successively extracting from the buffers the micro-frames in accordance with their input order until an accumulated data length of the micro-frames and additional data exceeds a data length loadable onto the standard cell to be sent in a next term, or until a predetermined extracting time period had elapsed as determined by a timer set upon arrival of a first input micro-frame;

a multiplexing processor for carrying out multiplex processing onto the standard ATM cell in accordance with a predetermined multiplexing scheme and for notifying said extracting portion of the data length loadable onto the standard ATM cell to be sent in the next term;

a sender for transferring an extracted standard ATM cell to an output channel; and a processing timing control circuit for controlling and coordinating processing timings of said extracting portion, said multiplexing processor and said sender.

7. The multiplex transmitter as claimed in claim 5 or 6, wherein there is further provided a distributor for distributing said input micro-frames, said distributor distributing said input micro-frames to said buffers having different multiplexing schemes or having different canceling times of the micro-frame in accordance with predetermined services conditions.

8. The multiplex transmitter as claimed in claim 7, wherein each of said buffers determines extracting order in accordance with the service conditions, extracts the micro-frames, and selects the multiplexing scheme in accordance with the service conditions.

9. The multiplex transmitter as claimed in claim 1 or 2, wherein said extracting portion performs extracting control not only of the transmission queuing buffer which stores the ATM cell onto which the multiplexing has been carried out, but also of the transmission queuing buffer which stores the ATM cell onto which no multiplexing has been carried out.

10. The multiplex transmitter as claimed in claim 5 or 6, wherein said extracting portion performs extracting control not only of said buffers which store multiplexed micro-frames, but also of a buffer which stores the standard ATM cell onto which no multiplexing has been carried out.

* * * * *